(12) United States Patent
Caplan et al.

(10) Patent No.: US 8,537,002 B2
(45) Date of Patent: *Sep. 17, 2013

(54) LOST AND FOUND TAGGING AND COMMUNICATION SYSTEM AND METHOD

(75) Inventors: Sergio D. Caplan, New York, NY (US); Stanley Szpilka, Riverdale, NY (US); Jeffrey A. Smith, Columbus, OH (US)

(73) Assignee: Four Gauchos LLC, New York, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/180,366

(22) Filed: Jul. 11, 2011

(65) Prior Publication Data

US 2012/0032798 A1    Feb. 9, 2012

Related U.S. Application Data

(63) Continuation of application No. 11/602,491, filed on Nov. 21, 2006, now Pat. No. 7,978,068.

(60) Provisional application No. 60/597,297, filed on Nov. 21, 2005.

(51) Int. Cl.
    *G08B 1/08* (2006.01)

(52) U.S. Cl.
    USPC .................................. 340/539.32; 340/572.1

(58) Field of Classification Search
    USPC ........................................ 340/539.32, 572.1
    See application file for complete search history.

(56) References Cited

U.S. PATENT DOCUMENTS

| 6,259,367 | B1 | 7/2001 | Klein | |
| 2002/0181667 | A1 | 12/2002 | Campbell | 379/45 |
| 2003/0214404 | A1 | 11/2003 | Thomas | 340/539.32 |
| 2004/0049396 | A1 | 3/2004 | Hope | 705/1 |
| 2004/0264661 | A1 | 12/2004 | Harris | 379/127.01 |
| 2006/0063540 | A1 | 3/2006 | Beuck | 455/456.3 |

OTHER PUBLICATIONS

Trackitback.com/main/aboutus_why.htm web page as found in web.archive.org database; web.archive.org purporting to have placed web page in database Jul. 3, 2004 (2 pgs.).

Ezfind.com web page as found in web.archive.org database; web.archive.org purporting to have placed web page in database Sep. 3, 2006 (2 pgs.).

ImHONEST.com web page as found in web.archive.org database; web.archive.org purporting to have placed web page in database Dec. 14, 2005 (1 pg.).

ImHONEST.com/FAQ.jsp web page as found in web.archive.org database; web.archive.org purporting to have placed web page in database on Oct. 25, 2006 (2 pgs.).

TeezTagz.com web page as found in web.archive.org database; web.archive.org purporting to have placed web page in database on Nov. 6, 2006 (2 pgs.).

Gottesman, Ben Z., Losing It, PCMag.com, Sep. 13, 2006, available at http://www.pcmag.com/print_article2/0,1217,a=188270,00.asp (4 pgs.).

*Primary Examiner* — Creighton Smith

(74) *Attorney, Agent, or Firm* — Rothwell, Figg, Ernst & Manbeck

(57) ABSTRACT

A method and system of facilitating communication between a finder of an article and an owner of the article including providing a unique ID to the owner and allowing the owner to register an association between the ID and owner contact information, allowing the owner to associate the ID and a virtual locale with the article, and forwarding communications of the finder of the article to the owner where the finder may provide no more information to the virtual locale than the ID and the communication.

21 Claims, 30 Drawing Sheets

| 800 | Home | What is zReturn? | Owners | Finders | Settings | Support | About Us | Purchase | Sign Off |

*Messaging*

"Insta-Found" messages from people who have found one of your lost items always go to your email. As an option they can also go to any of your messaging names.

810 — AOL Instant Messenger [sergdc]
820 — MSN Messenger (Microsoft) [sergdc]
830 — Yahoo! ID [pokerordie]

*Contact Info optional*

840 — Under extreme circumstances a finder may be unable to contact you via this system (i.e. damaged zTag). Should such a case ever occur and the zReturn staff needs to contact you, the more contact info we have, the better. *This info is considered private and confidential and will not be divulged to anyone.

First name : [Sergio]
Last name : [Caplan]
Address : [123 Main Street]
City : [New York]
State : [New York]
Zip : [10021]
Phone : [212-555-1212]

*Email & Password*

850 — Your email is used to login, as well as to send and receive anonymous emails between you and another Owner or Finder. Therefore, an email is required. Only use these fields to change your current email and/or password.

Email : [Sergio@WarpTV.com]
Verify Email : [ ]
860 — Old password : [ ]
New password : [ ]
Verify new password : [ ]

[Save Changes]
[Cancel]

Figure 8

| 900 | Home | WHAT IS zRETURN? | Owners | Finders | Settings | Support | About Us | Purchase | Sign Off |
|---|---|---|---|---|---|---|---|---|---|
| | EDIT | DELETE | 154052734 | Kensington Wireless Mouse | | | | | |
| | EDIT | DELETE | 164217176 | Black Targus Knapsack | | | | | |
| 910 | EDIT | DELETE | 186196302 | Blue Knapsack. Used just for gym, so chances are it has nothing more than some "really smelly and sweaty" clothes. | | | | | |
| 920 | | | | | | | | | |
| 930 | EDIT | DELETE | 200085449 | Black leather wallet. It was my grandfather's, so I just want it back, no matter how empty it may be. | | | | | |
| 940 | | | | | | | | | |
| | EDIT | DELETE | 222909545 | Motorola cell phone, (Cingular) | | | | | |
| | EDIT | DELETE | 263394164 | Sony Ericsson cell phone | | | | | |
| | | Lost | 277899028 | Gateway 7330 Laptop | | | | | |
| | EDIT | DELETE | 278179049 | Black notebook. Has my a fountain pen in there, given to me by my grandfather. | | | | | |

Figure 9

1000 — Home | WHAT IS zRETURN? | Owners | Finders | Settings | Support | About Us | Purchase | Sign Off TO RETURN A LOST ITEM, ENTER THE
zID NUMBER OF LOST ITEM HERE zReturn™

[ zID _____ Find ]

1010 — View Open zCases — View current open zCases with Owners of items you found 1020 — Account Settings — Change your password, contact options, etc.

Figure 10

```
                          From: Joseph Doe <JoeDoe@somedomain.org>
1310 ─────────────────────To: Owner-277899028@zReturn.com
                          Date: Saturday, November 18, 2006 05:53 pm
1320 ─────────────────────Subject: Found your lost laptop Hello. I found your laptop in the booth of the "Eat
                          at Joe's Restaurant on 73rd and 1st.  I left it with
                          the manager, his name is Fred Smith, and his number
                          is 212-555-1212.
```

Figure 13A

```
1330 ─────────────────────
                          From: zReturn Finder <Finder-277899028@zReturn.com>
                          To: Sergio Caplan <SergioDC@WarpTV.com>
1340 ─────────────────────Date: Saturday, November 18, 2006 05:53 pm
                          Subject: Found your lost laptop Hello. I found your laptop in the booth of the "Eat
                          at Joe's Restaurant on 73rd and 1st.  I left it with
                          the manager, his name is Fred Smith, and his number
                          is 212-555-1212.
```

Figure 13B

LOST AND FOUND TAGGING AND COMMUNICATION SYSTEM AND METHOD

CROSS REFERENCE TO RELATED APPLICATION

The present application is a continuation of U.S. patent application Ser. No. 11/602,491 filed Nov. 21, 2006, which in turn claims priority under 35 U.S.C. §119(e) to U.S. provisional patent application No. 60/597,297 filed Nov. 21, 2005. Each application is incorporated herein by reference.

FIELD OF THE INVENTION

The present invention relates to methods and systems for allowing a person, such as a finder of a valuable or other object, to communicate with the owner of the valuable or other object.

BACKGROUND OF INVENTION

All U.S. patents referred to herein are hereby incorporated by reference in their entireties. In the case of conflict, the present specification, including definitions, will control.

For as long as there have been portable possessions, there have been opportunities to for them to be mislaid or go missing. When such possessions have intrinsic, subjective and/or sentimental value, the loss can be especially difficult for the owner of the possession. In today's society such possessions and objects might include a ring of keys, a portable music player with a large music collection, a laptop computer, a digital camera containing the only copy of treasured family photos, or any number of portable objects.

One time-tested method of protecting against the permanent loss of an object is for the owner to write her name and contact information, for example, a phone number and an address, on the object or on a tag or label attached to the object. Then, when the object is lost or otherwise separated from its owner, a person finding the object can use the name and contact information to contact the owner and communicate arrangements for the return of the object to the object's owner. However, this approach has drawbacks. First, such an approach provides information about the owner's identity to an unknown person. If the lost object were a ring of keys, a finder with mal-intent could use the information on the tag to discern the identity and address of the owner and then use the keys to gain access to her residence. Second, such an approach may not provide contact information with the best currency—such as when the owner is traveling or has recently moved. If the information on the tag is not current and the finder cannot quickly communicate with the owner, an opportunity may be lost for the finder to return the object to the owner before the owner continues in her travels.

Another method for tagging possessions to protect against their loss is referred to in U.S. Pat. No. 6,259,367 to Klein. This patent refers to the use of RFID tags encoded with "obfuscated" owner information. The RFID encoded information may be used to retrieve a file containing more detailed owner contact information. A drawback to Klein's approach is that a finder must gain access to an RFID tag reader and appropriate software to decode the information and access the file through a network. When this is done through a third party, either the third party must disclose the owner's private contact information or the finder must trust the third party to return the item to the owner. As with conventional tags, Klein's system may lack the most current contact information, create delays (and lost opportunities) in returning possessions, and result in the loss of owner privacy.

Other systems purport to overcome these disadvantages but fall short. Some require the use of a shipping intermediary in order to return the object to its owner. Some require a third party intermediary to process a "found" report and provide return instructions to a finder.

SUMMARY OF THE INVENTION

The present invention overcomes the disadvantages of the prior systems by providing for a timely and anonymous communication channel between a finder of an object and an owner of an object.

In accordance with one aspect of the invention, there is a method of facilitating communication between a finder of an article and an owner of the article which includes providing a unique ID to the owner, allowing the owner to register an association between the ID and owner contact information, allowing the owner to associate the ID and a virtual locale (for example, a website address) with the article, and forwarding communications of the finder of the article to the owner where the finder may have provided no more than the ID and the communication to the virtual locale.

In accordance with another aspect of the invention, there is a system for facilitating communication between a finder of an article and an owner of the article which includes a virtual locale, a database for storing an association between owner contact information and a unique ID, and a module for forwarding finder communications to the owner where the finder provides as little information as the communication and the unique ID to the virtual locale.

BRIEF DESCRIPTION OF THE DRAWINGS

FIG. 8 depicts a contact information screen that could be employed in accordance with embodiments of the invention;

FIG. 9 depicts a view/edit tag screen that could be employed in accordance with embodiments of the invention;

FIG. 10 depicts a finder main menu that could be employed in accordance with embodiments of the invention;

FIGS. 13A and 13B depict anonymously addressed e-mails that could be employed in accordance with embodiments of the invention.

DETAILED DESCRIPTION OF THE INVENTION

In the following detailed description, reference is made to various specific embodiments in which the invention may be practiced. These embodiments are described with sufficient detail to enable those skilled in the art to practice the invention, and it is to be understood that other embodiments may be employed, and that structural and logical changes may be made without departing from the spirit or scope of the present invention.

The present invention provides systems and methods that allow a person, such as a finder of a lost or misplaced object, to anonymously communicate with another, such as the owner of the object. The systems and methods can be useful in facilitating the return of the object to its owner.

Figure 2A:
FIGS. 2A and 2B depict examples of tags with associated IDs and reference addresses that could be employed in accordance with embodiments of the invention.
Figure 2B:

In an aspect of the invention, an "owner," which can be an individual or entity wishing to protect portable personal property, is provided with specially prepared tags. With reference to FIGS. 2A and 2B, such tags can be of any size or shape or type, such as a printed adhesive label 200, a sew-on patch (not pictured), a plastic key-ring tag 250 with a hole for a key ring or keychain 230, or even an electronic tag (e.g. an RFID) (not pictured). Two common features of the tags of the present invention are a unique identifying feature such as an ID (e.g., a string of alphanumeric characters) 210 and a reference to a specific website or other unique virtual locale (e.g., a text messaging number, an SMS number, or an instant messaging screenname) 220. The ID 210 may be printed and/or electronically stored on or within the tag. As with the ID, the reference to the specific website or other virtual locale 220 may also be printed and/or electronically stored.

As used in some of the figures, a tag is referred to as a zTag and an ID is referred to as a zID.

In an embodiment, the owner would then affix tags 200 or 250 to any portable possession which she desires to be easily returned to her if lost or otherwise separated from her. Such objects and possessions might include an attaché case, a ring of keys, a portable music player with a large collection of music, a digital camera with irreplaceable family photos, a cell phone, and the like.

Having been provided with tags and having affixed the tags to various possessions, the owner can then register the tag IDs and the owner's contact information on a centralized and network accessible database according to the present invention.

Figure 1A:
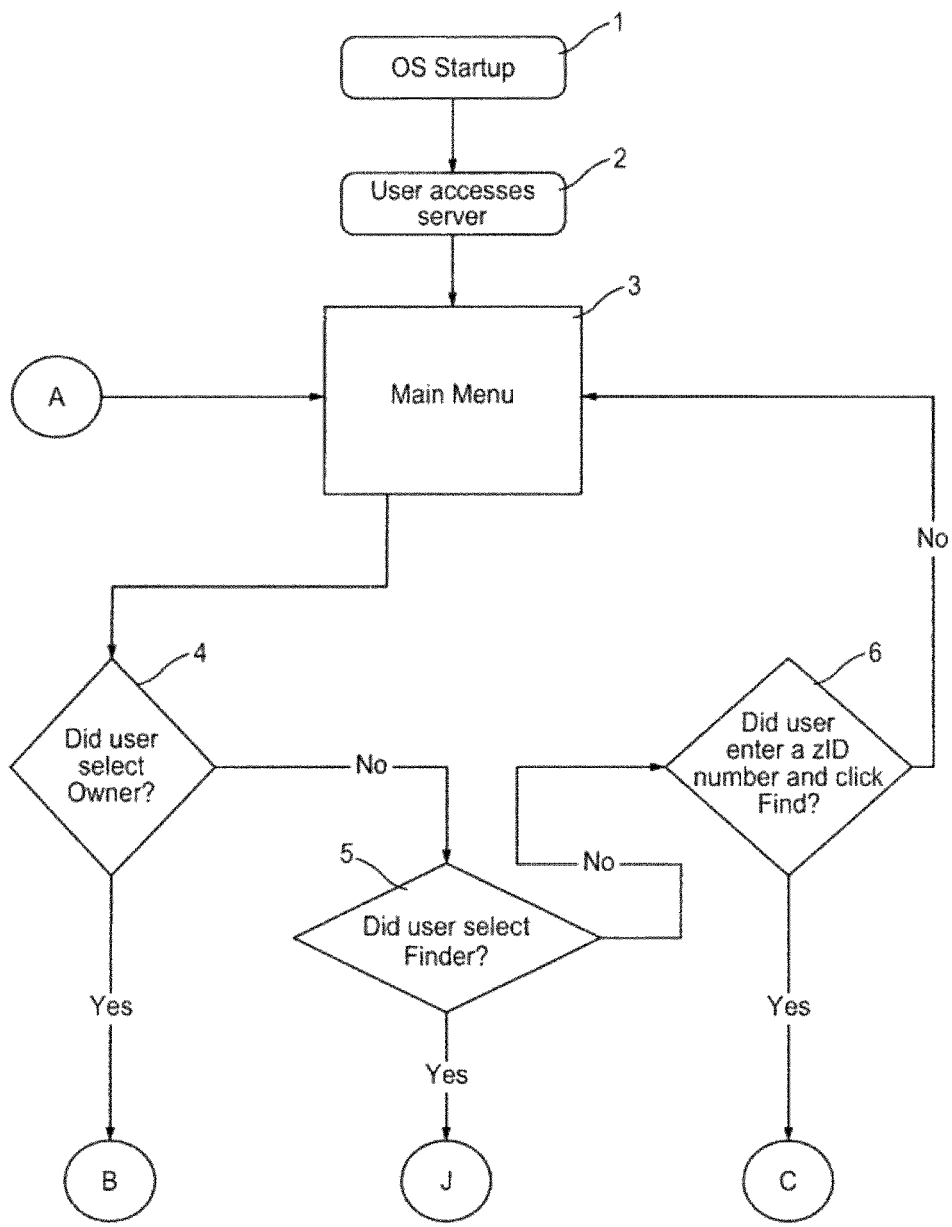
FIGS. 1A, 1B, 1E, 1F, 1G, 1H, 1I, 1J, 1K, 1L, 1M, 1N, 1O, 1P, 1Q, 1R, 1S, 1U, 1V, 1X, 1Y, and 1Z depict steps of a method in accordance with a preferred non-limiting embodiment of the invention.

With reference to FIG. 1A, a user, in this case, an owner, accesses a browser or client capable device, starting its operating system, ref. 1, if necessary. Then the user navigates to the server, ref. 2, using the browser or client capable device and receives a main menu, ref. 3.

Figure 3:
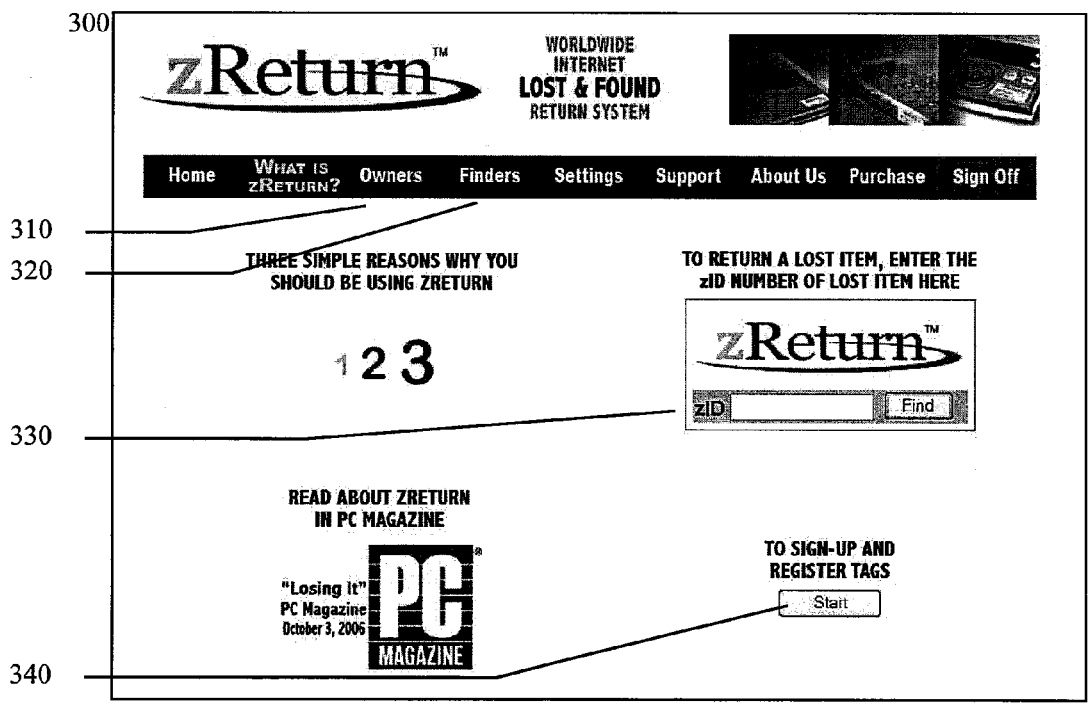
FIG. 3 depicts a main menu that could be employed in accordance with embodiments of the invention.

With reference to FIGS. 3 and 1A, the server displays a menu 300, ref. 4, which in a preferred embodiment has a menu button for requesting the owner menu 310, a menu button for requesting the finder menu 320, and a data field for entering an ID of a found object 330.

Figure 1B:
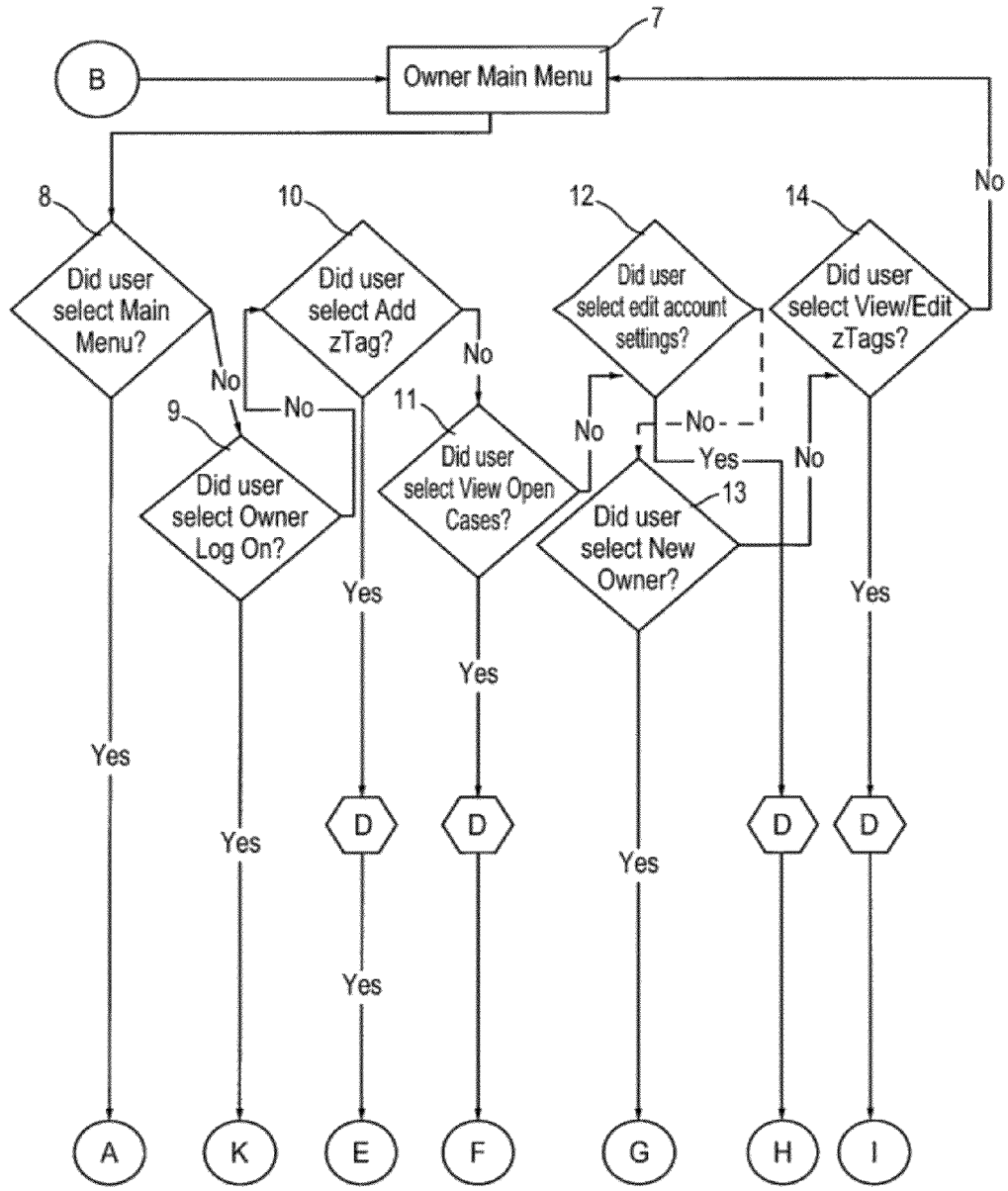
Figure 7:
FIG. 7 depicts a new user screen that could be employed in accordance with embodiments of the invention.

In an exemplary embodiment, a user who is new to the system can select the option 340 "sign-up and register," ref. 13 (FIG. 1B), from the main menu. When this option is selected, a data entry screen is displayed. With reference to FIG. 7, the data entry screen may optionally be preceded by a "bot-killer" registration screen 700, in which the user enters initial credentials such as an email address 710 and password 720, and additionally enters a Verification Code in a field 730, where the Verification Code 740 is displayed in a optically obfuscated manner so that an automated "bot" cannot register as a user. The registration screen may optionally include a consent to usage terms feature 750. Following this optional bot-killer data entry screen, with reference to FIG. 8, the screen 800 may include fields for adding and editing data such as the user's name 840 and various types of contact info, ref. 33. Generally, in addition to a password, the only other required field is an unambiguous contact field entry, such as the user's email address 850. If a user selects "save changes" or "add the new user," ref. 34, the entered data is validated, ref. 35, and the new user is added to the database, ref. 37. Then the main owner screen is displayed, ref. 7 (FIG. 1B). Should the entered email address already exist in the database, the user is alerted to the error, ref. 36, and this procedure is restarted, ref. 33. In a preferred embodiment, there is an option that the user can always select, ref. 38, to return to the main owner menu, ref. 7, without entering any information.

Figure 4:
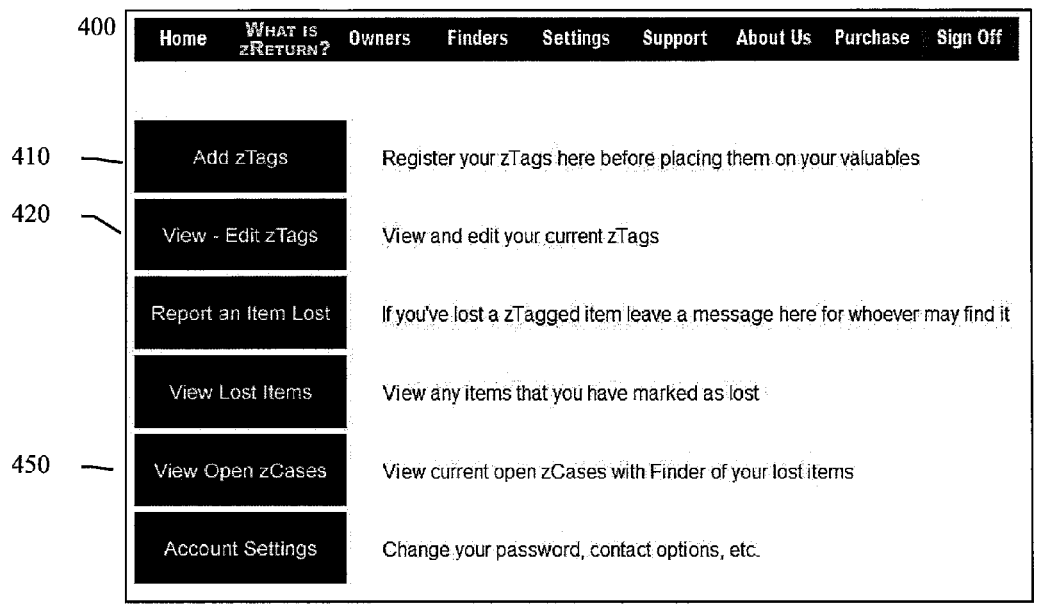
FIG. 4 depicts an owner main menu that could be employed in accordance with embodiments of the invention.

When a user selects the owner option 310, ref. 4, the main owner menu 400 (FIG. 4) is displayed, ref. 7 (FIG. 1B). The owner menu offers owner related choices, including going back to the Main Menu, ref. 8.

Figure 1E:
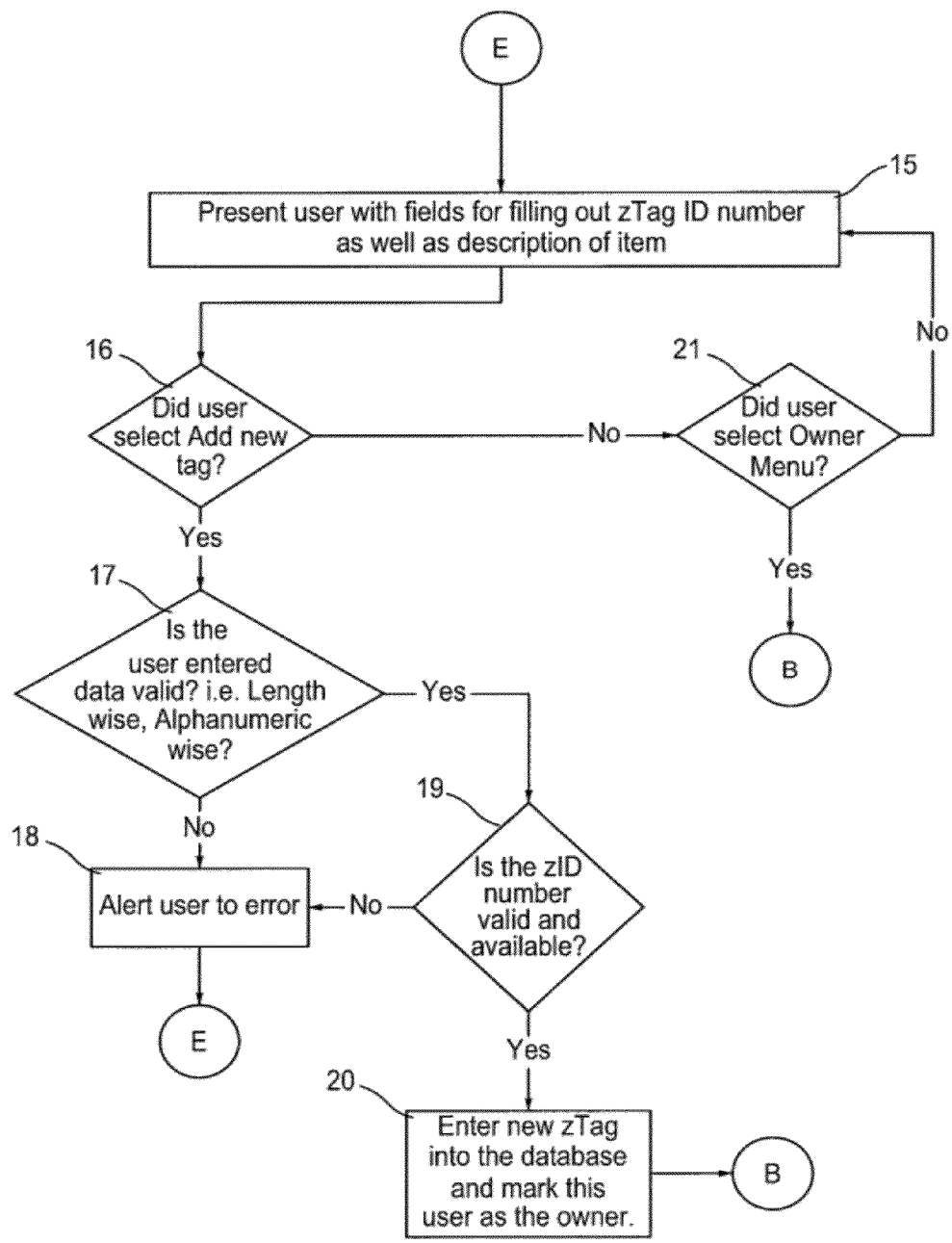
Figure 1F:
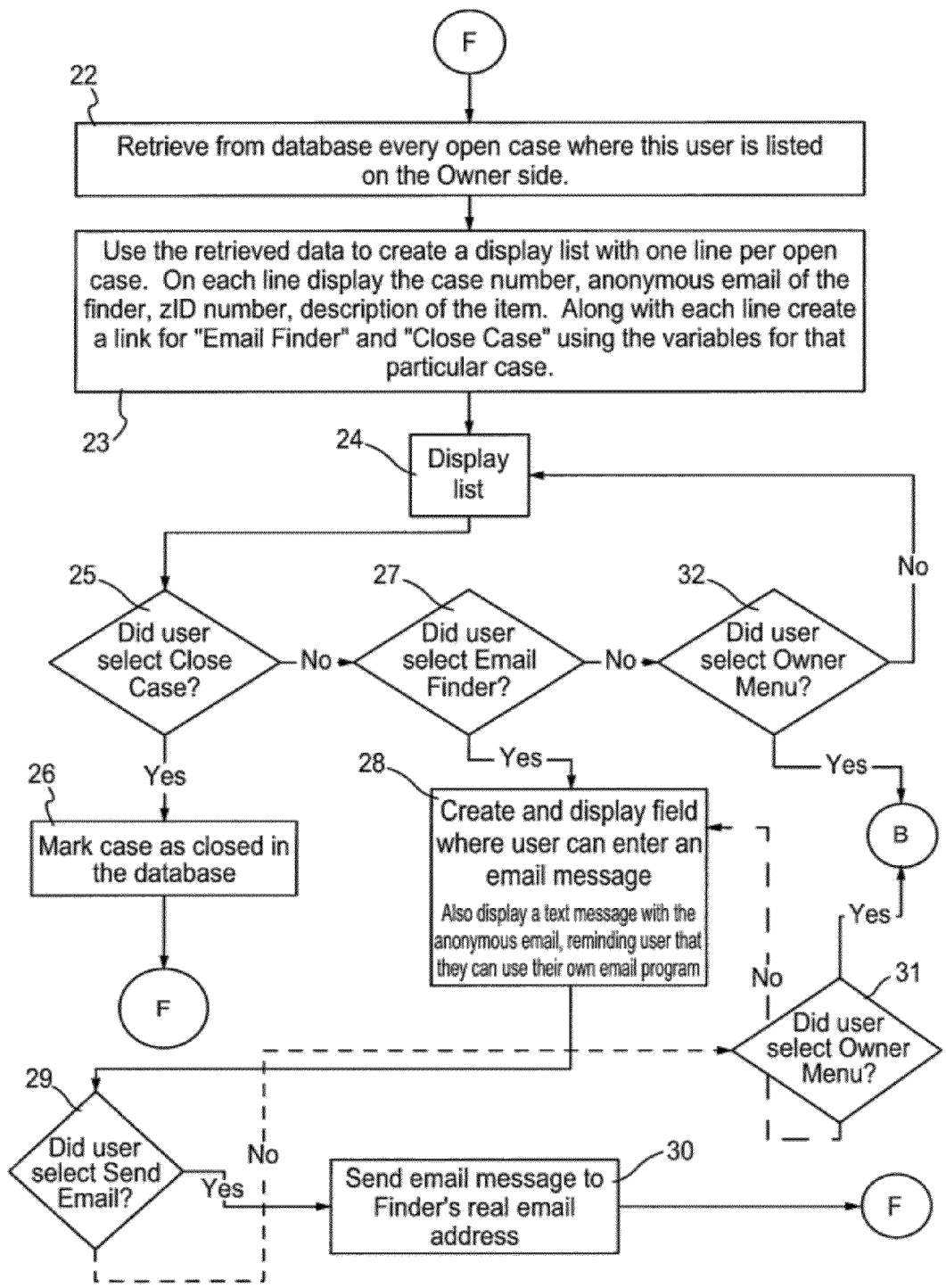
Figure 1G:
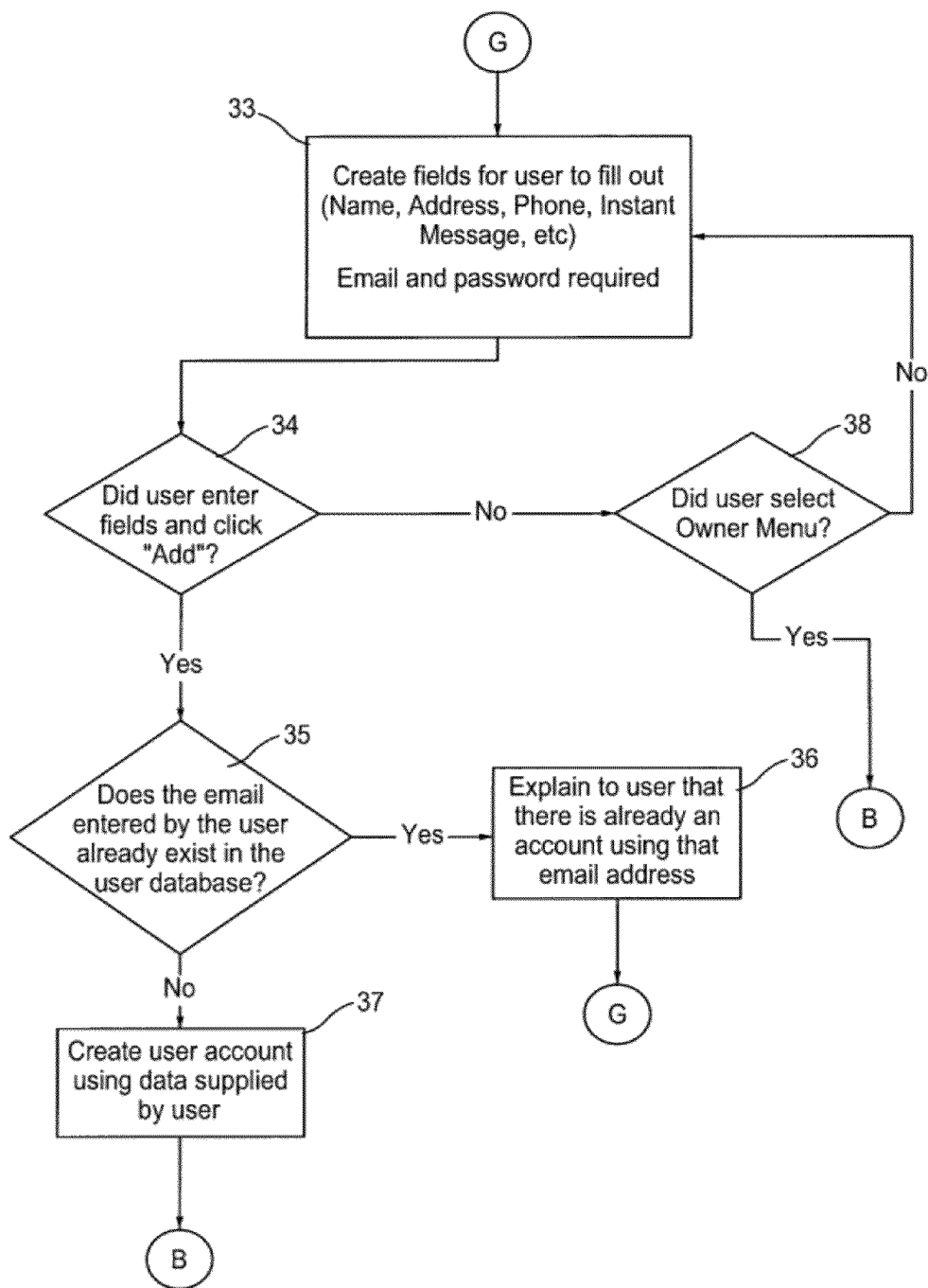
Figure 1H:
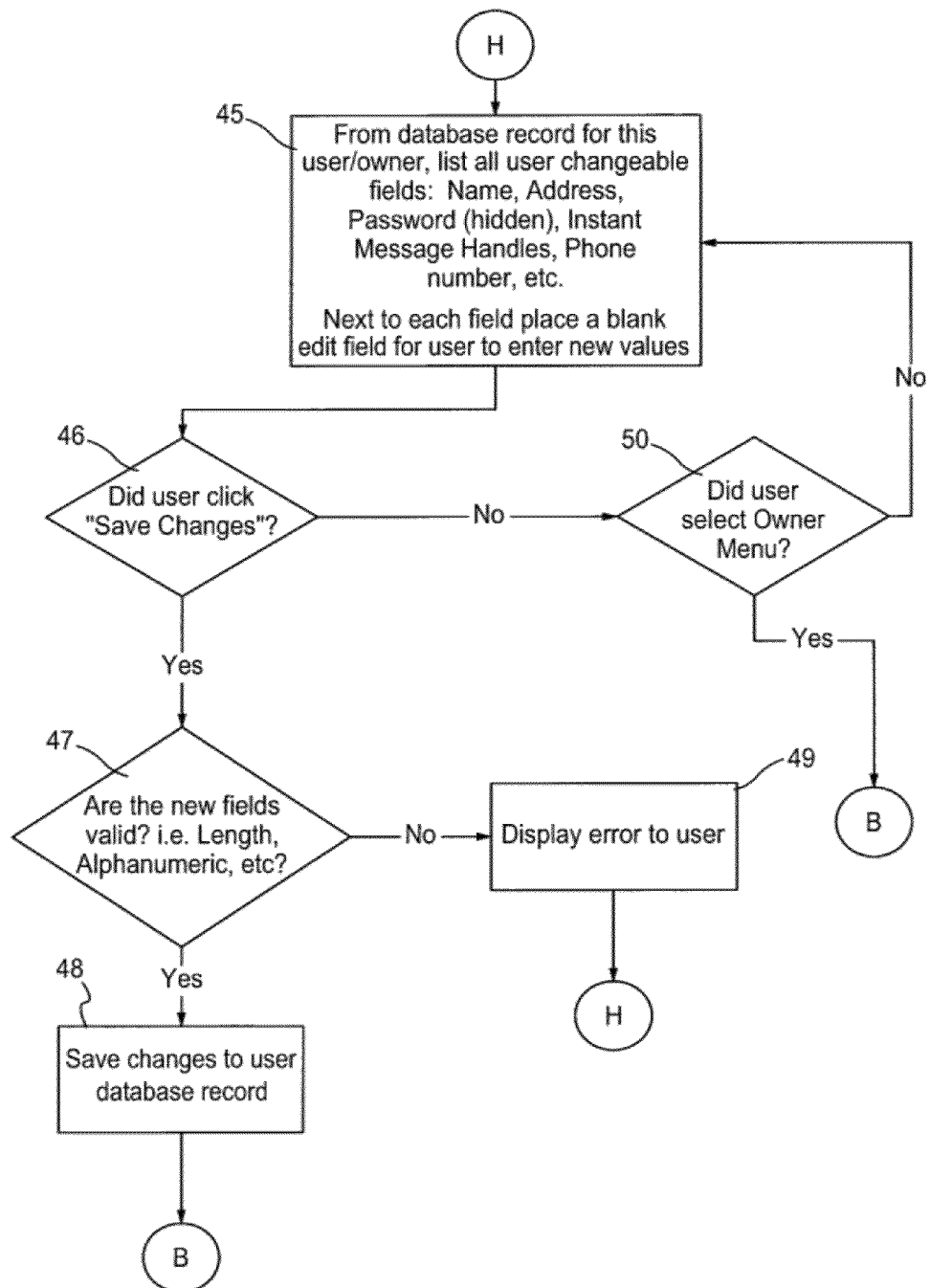
Figure 1I:
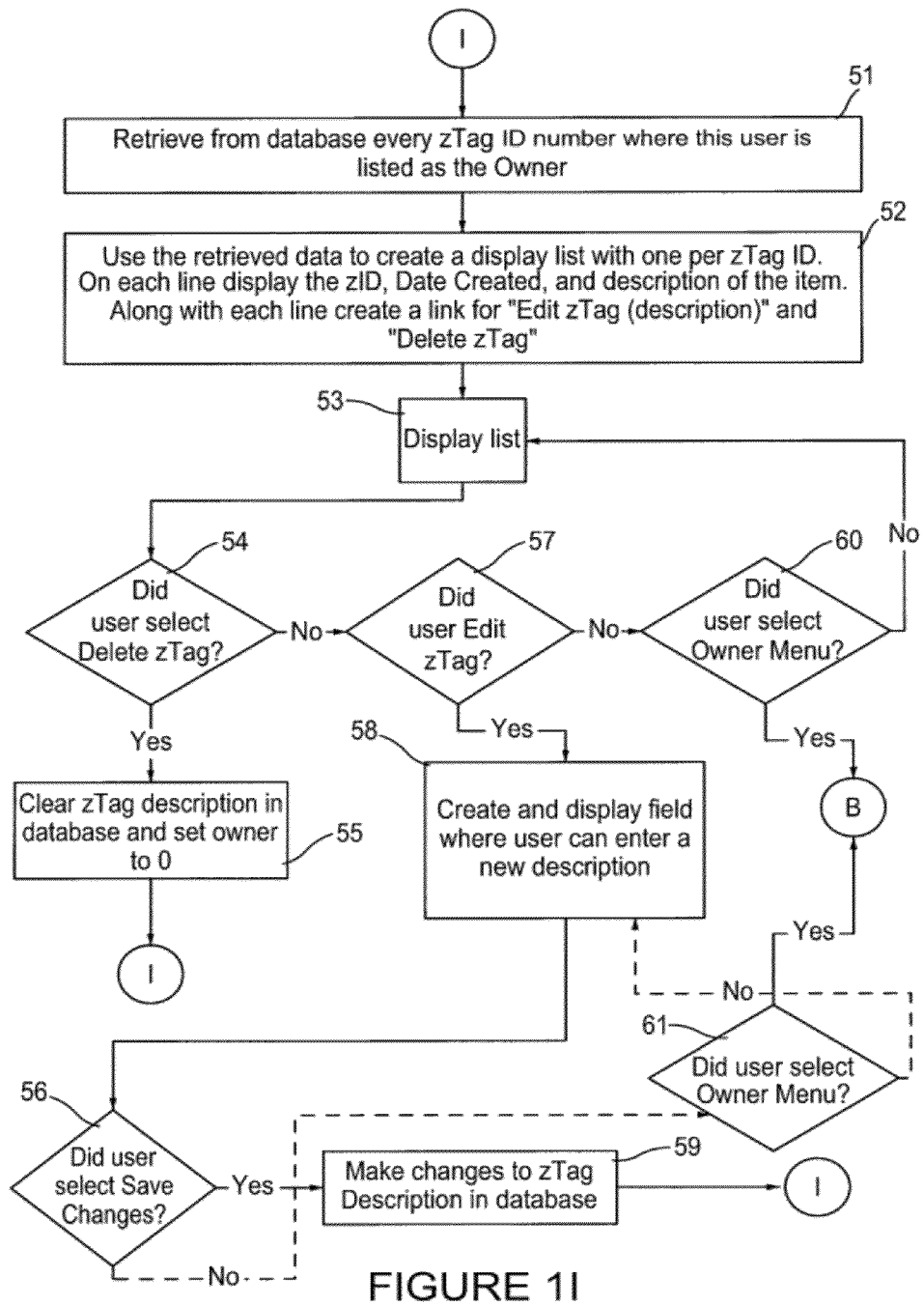
Figure 1J:
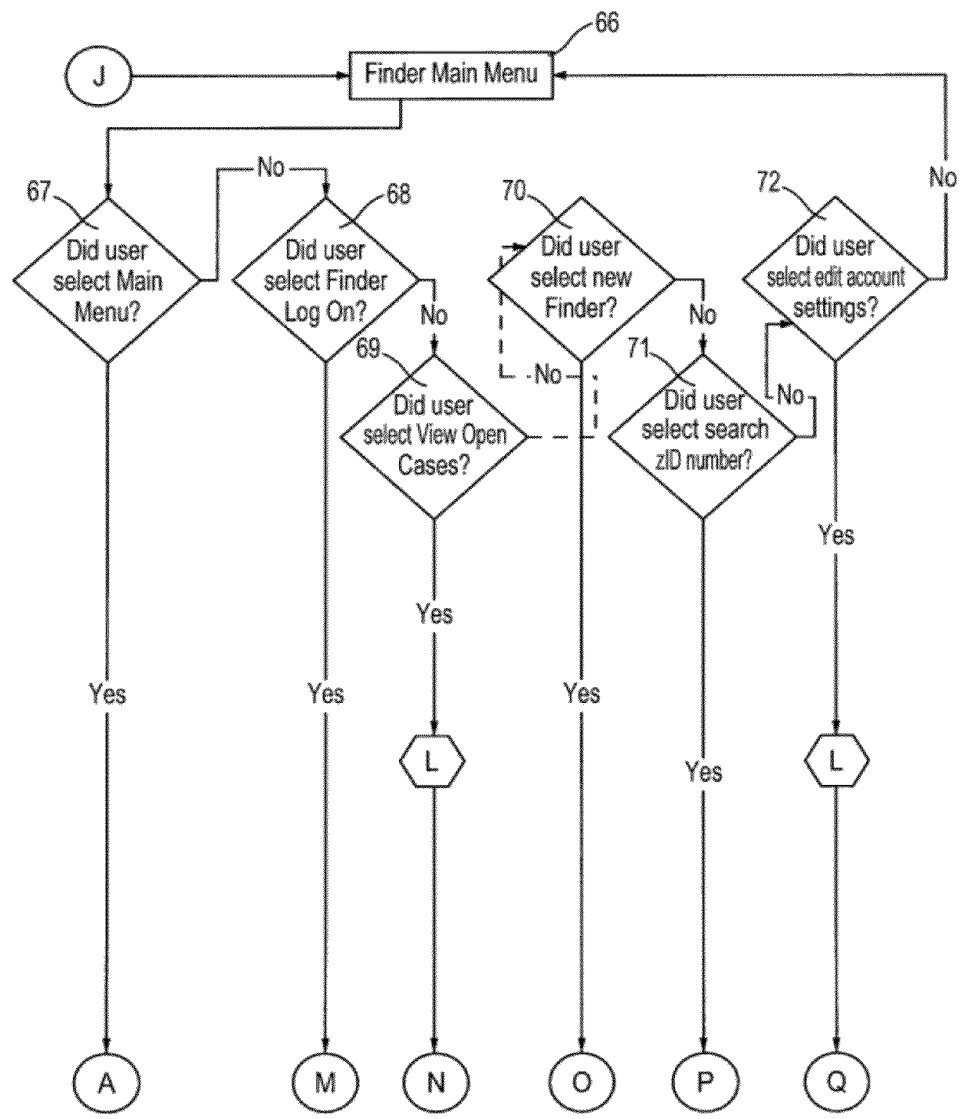
Figure 1K:
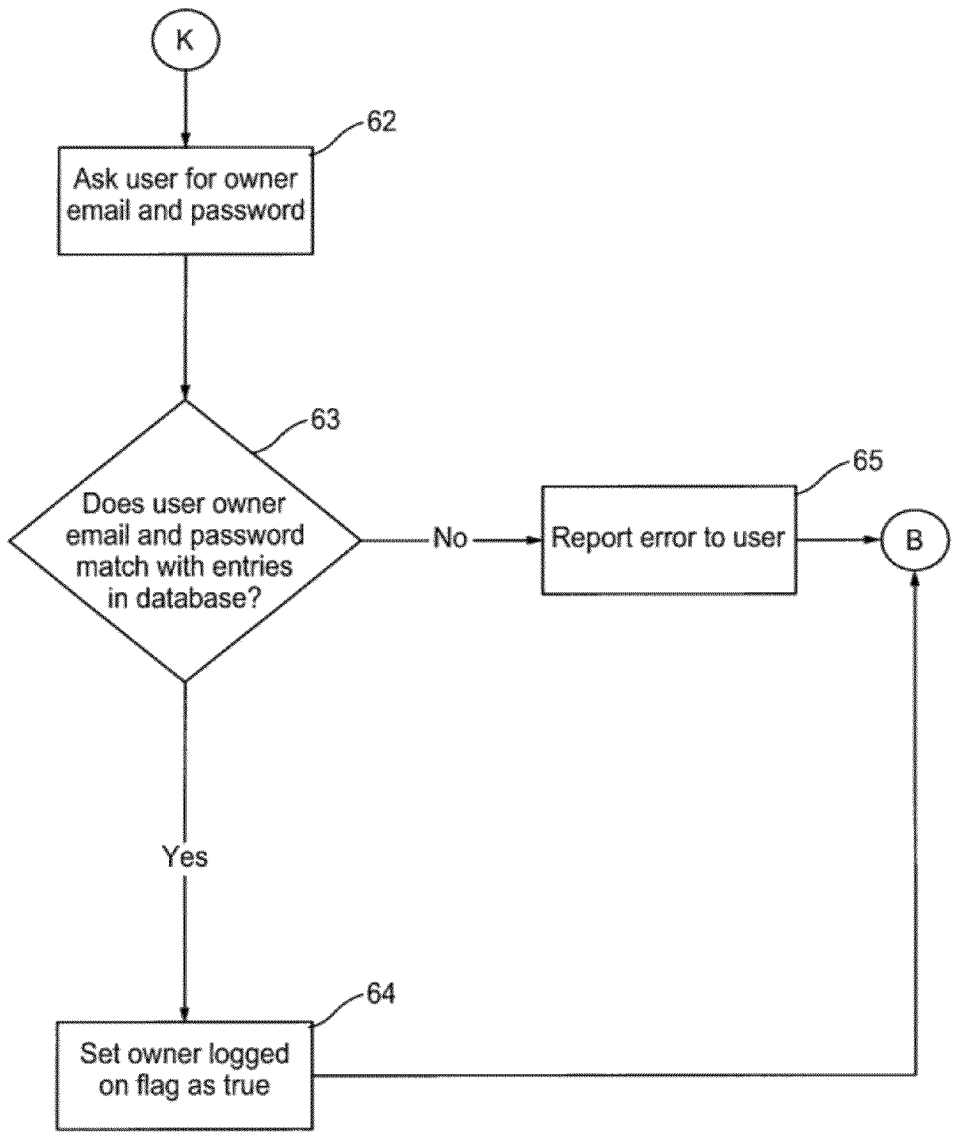

Should a user select Owner Log On, ref. 9, an Owner Log On screen is displayed (not shown) and the user is prompted for their email address and password, ref. 62 (FIG. 1K). The system verifies these credentials against those in a database to determine whether they match a valid user, ref. 63. If there is a match, a flag is set to indicate that the owner is logged on for this session, ref. 64, and the owner's unique user id, herein userid, is placed in memory for future reference. If there is no match, an appropriate error message is displayed to the user, ref. 65. Once these steps are completed, the main owner menu is displayed, ref. 7 (FIG. 1B).

Figure 5:
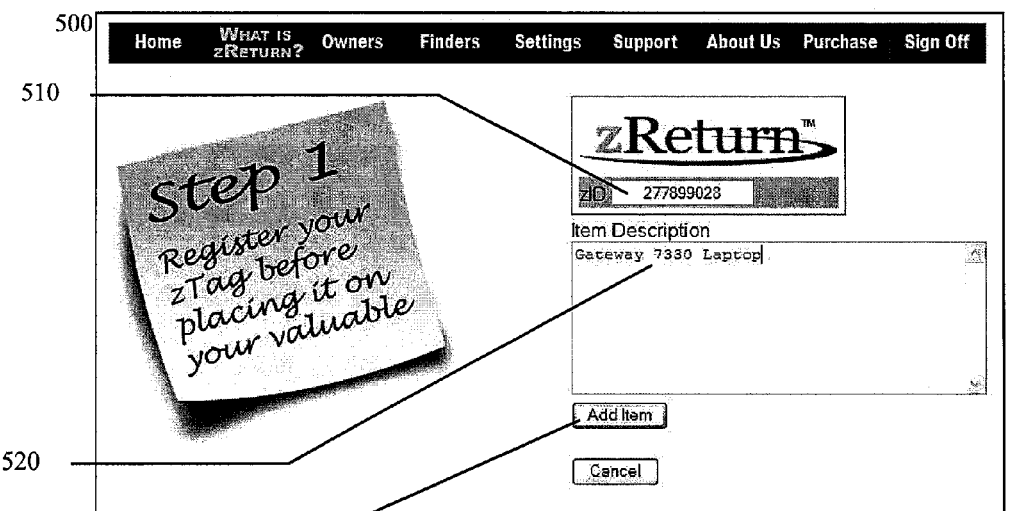
FIG. 5 depicts an ID registration screen that could be employed in accordance with embodiments of the invention.

An owner wishing to associate an ID with his or her contact information must register the ID with the database. In an exemplary embodiment, the owner/user selects the "add a zTag" menu item 410 (FIG. 4), ref. 10, and is prompted, ref. 15 (FIG. 1E), with a screen 500 as shown in FIG. 5 containing fields for entry of the relevant information for that tag such as its ID 510 and a description 520 of the associated object or possession. However, before entering this part of the program, subroutine D is called to validate that the "owner logged on" flag is set to true, ref. 39 (FIG. 1L), and return, ref. 40, to the calling step in the application if so, or display an appropriate message, ref. 41, and return to the main owner menu, ref. 7 (FIG. 1B), if not. Once the user supplies the information and selects "add item" 530, ref. 16 (FIG. 1E), the server confirms that the data is in the valid format, ref. 17, and that the user has entered a valid and available ID, ref. 19. Any error in this process is displayed to the user, ref. 18 and the screen 500 may be displayed, ref. 15. If there are no errors, the database is updated with the tag information and the database record is associated with the user, ref. 20. Control then passes to the main owner menu 500, ref. 7. There, the user may opt, ref. 21, to return to the main owner menu, ref. 7, without entering any information.

Figure 6:
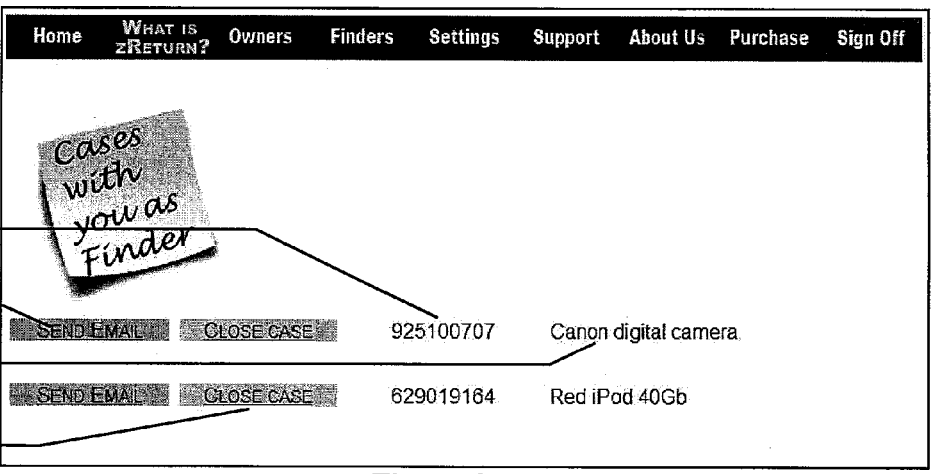
FIG. 6 depicts an open case screen that could be employed in accordance with embodiments of the invention.

In the illustrated embodiment, when an owner wishes to see open cases, where an open case is defined as an instance of an open line of communication with a finder of an owner's tagged item, they select the menu item "view open cases" 450, (FIG. 4), ref. 11 (FIG. 1B). Before displaying the view open cases screen, subroutine D is executed in a manner similar to that earlier described with regard to subroutine D. The database is then queried for any open cases where the user's userid is listed as the owner. Retrieved records are used to create a list 600 (FIG. 6), which is displayed to the user, where each line is related to an open case, and includes information from that particular case. For example, a list of open cases might include an ID of a tagged object 610 and a description of the tagged object 625. Links may be associated with each case-related line which enable a user to close the case 650 or communicate with the finder of that case 620. There are numerous options throughout this menu, and its submenus, so that the user can always select an option, ref. 31 (FIG. 1F), to return to the main owner menu without entering any information. If a user selects "close case," ref. 25, the case is marked as closed in the database, ref. 26, and the open case screen 600 is updated, ref. 22. Should the user select to contact the finder of a particular case, ref. 27, they are prompted and given a field to type their email message, ref. 28. In one embodiment, a finder's anonymous email address is displayed with a reminder that the user can email the finder using their own email program. Once the user selects "send message," ref. 29, the finder's real email address is used (yet never displayed to the user) to send an email, ref. 30. This part of the program is then directed to restart, ref. 22.

Existing users can choose to edit their account settings, ref. 12. Before displaying the account settings editing screens, subroutine D is run in a manner similar to that already described with regard to subroutine D. The database is queried for information associated with this user through use of a userid. In one embodiment, the user information will be displayed in editable fields, ref. 45. With reference to FIG. 8, such fields may include fields for the user's name 810, addresses, password 860, Instant Message Handles 810, 820, and 830, phone numbers, and so on. The user may select to return, ref. 50, to the main owner menu, ref. 7, without entering any information. If the user selects "save changes," ref. 40, the system confirms that the new data are valid, ref. 47, and if so, saves the record to the database, ref. 48. Then the main owner window, ref. 7, is then displayed to the user. If the validation fails, an appropriate message may be displayed to the user, ref. 49, and the edit account settings screen is displayed, ref. 45.

In an exemplary embodiment, a user who has tags already registered in the system may edit the data, ref. 14, associated with them. Before entering this part of the program, subroutine D is executed in a manner similar to that previously described herein. Following verification of the "owner logged on" flag by subroutine D, the database is queried for all tags associated with a userid of the user, ref. 51. With reference to FIGS. 1I and 9, for each such tag in the database, an information line may be created, ref. 52, containing the tag's associated information such as the tag ID 930, the date it was registered, description 940 and so on. Also, two links may be created for each tag, the links respectively allowing a user to "edit" the information associated with the tag, or "delete" the associated tag record from the database. The list is then displayed 900 to the user, ref. 53. There may also be included on this menu, ref. 60, and its submenus, e.g., ref. 61, an option for the user to select to return to the main owner menu, ref 7, without entering any information. Should a user select a delete tag link 920, ref. 54, the tag record's description and owner userid are both cleared in the database, ref. 55, making the ID available for later use. From this point, the list is refreshed beginning at ref. 51. If a user opts to edit a tag 910, ref. 57, then an editable field may be displayed, ref. 58, containing that tag's current description and operable to allow the user to edit the description in a manner similar to that depicted in FIG. 5. Once the user chooses to save the new description, ref. 56, the database entry for that tag is updated, ref. 59. From this point, the list is refreshed beginning at ref. 51.

Thus far, discussion has been made of how an owner of a tagged object can access and utilize a system in accordance with the present invention in order to supply and/or manage at least contact information and tag IDs. Another aspect of the invention involves finders. A finder is someone who has found an object, most likely lost, with an attached tag such as the exemplary tags depicted in FIGS. 2A and 2B. Such tags direct a finder to, for example, a website or other virtual locale.

In a preferred embodiment of the present invention, a tag attached to an object will direct a finder to access a website named thereon 220. At such a website, the finder may select the finder option, ref. 5, resulting in the display of the finder main menu, ref. 66. The finder main menu provides selections related to finders. Additionally, the finder may opt to return to the main menu, ref. 67.

According to one embodiment of the invention, a finder who is new to the system can select the option "new user," ref. 70. The program then creates and displays editable fields which may include fields for the user's name and various types of contact information, ref. 100 (FIG. 10). Required information may include a password and an unambiguous contact information such as an email address. If a user selects to "add the new user," ref. 101, the system makes sure that the supplied information is valid, ref. 102, and then adds the new user data to the database, ref. 103. At this point, the main finder window is displayed, ref. 66 (FIG. 1J). Should the email address already exist in the database, the user is alerted to the error, ref. 104, and the display is refreshed, starting at ref. 100. Additionally, there may be an option, ref. 105, for the user to select to return to the main owner menu, ref. 66, without entering any information.

Figure 1L:
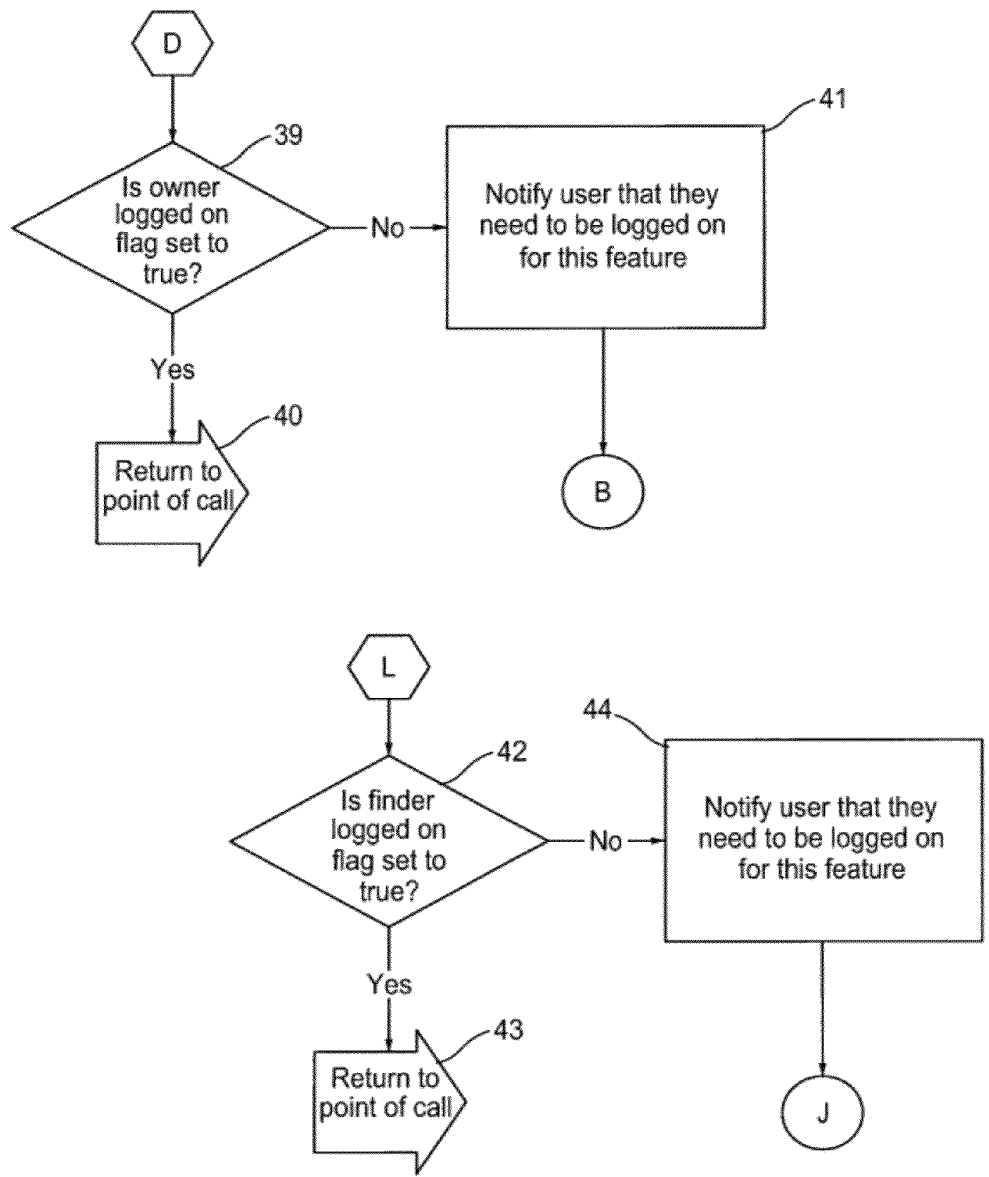
Figure 1M:
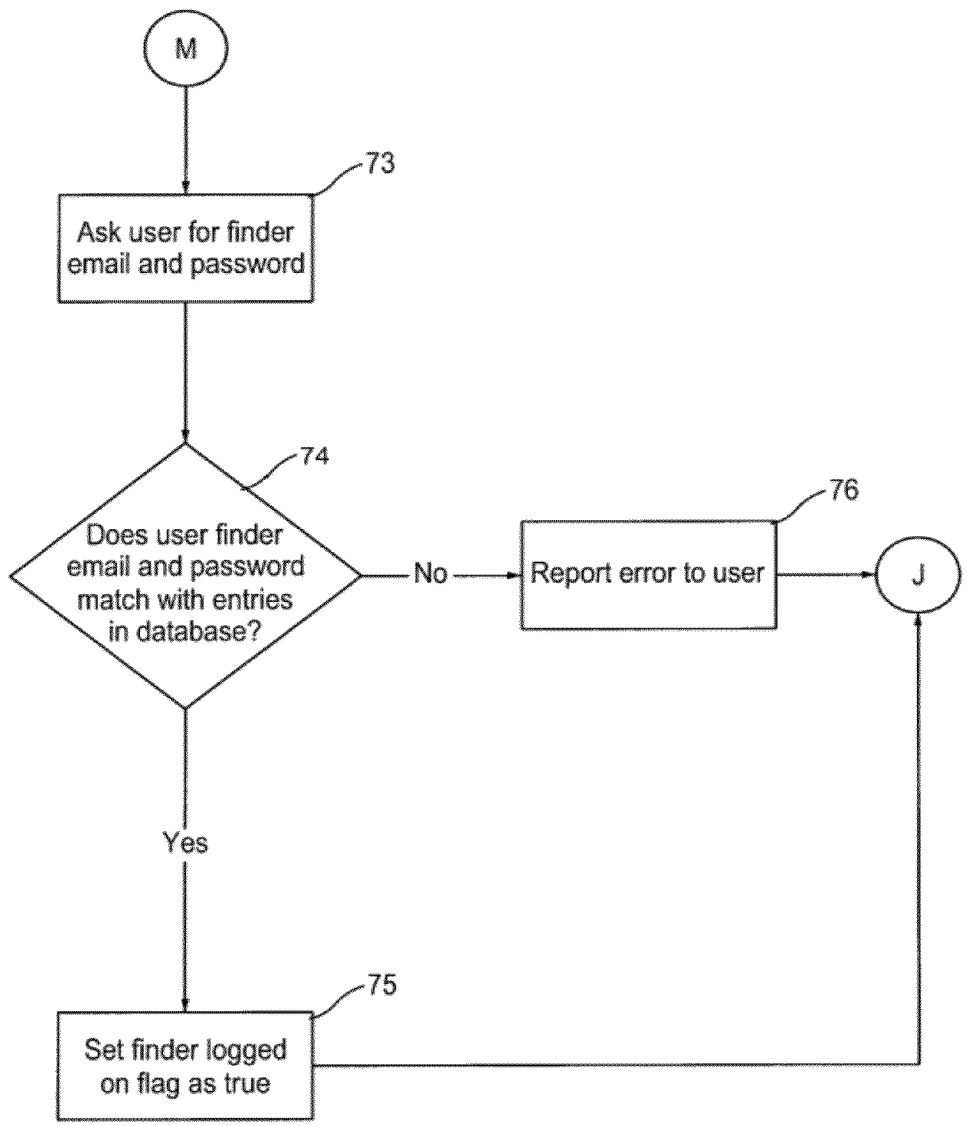

Should a user select "Finder Log On," ref. 68, they are prompted for credentials such as their email address and a password, ref. 73 (FIG. 1M). The database is then queried for a match to the entered credentials, ref. 74. If a match is found, then a flag is set to indicate that the finder is logged on for this session, ref. 75, and the finder's unique user id, herein userid, is placed in memory for future reference. If no match is found, an error message is displayed to let the user know that they are not logged on, ref. 76. In either case, the main finder menu 1000 (FIG. 10) is displayed, ref. 66.

Figure 1N:
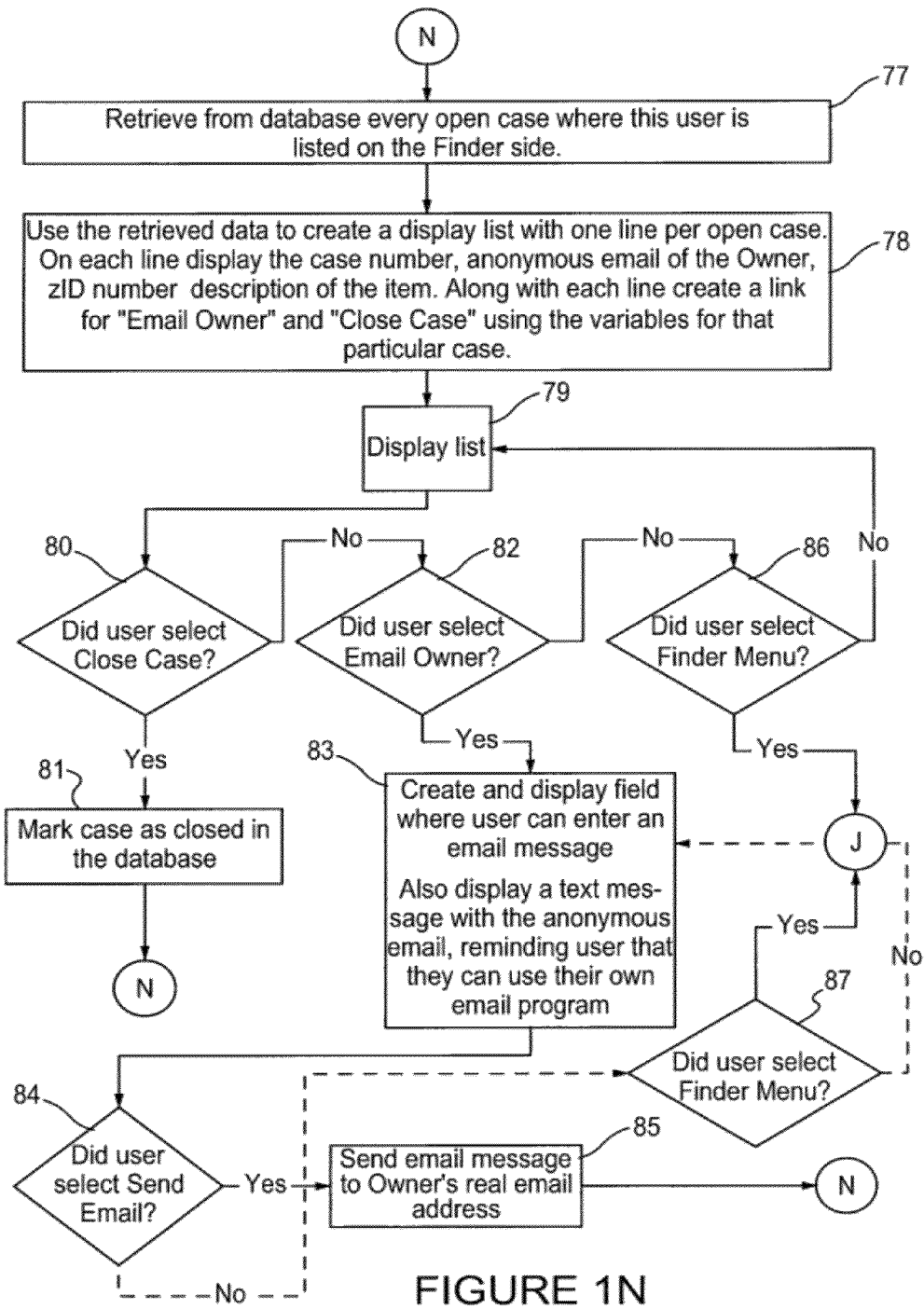
Figure 1O:
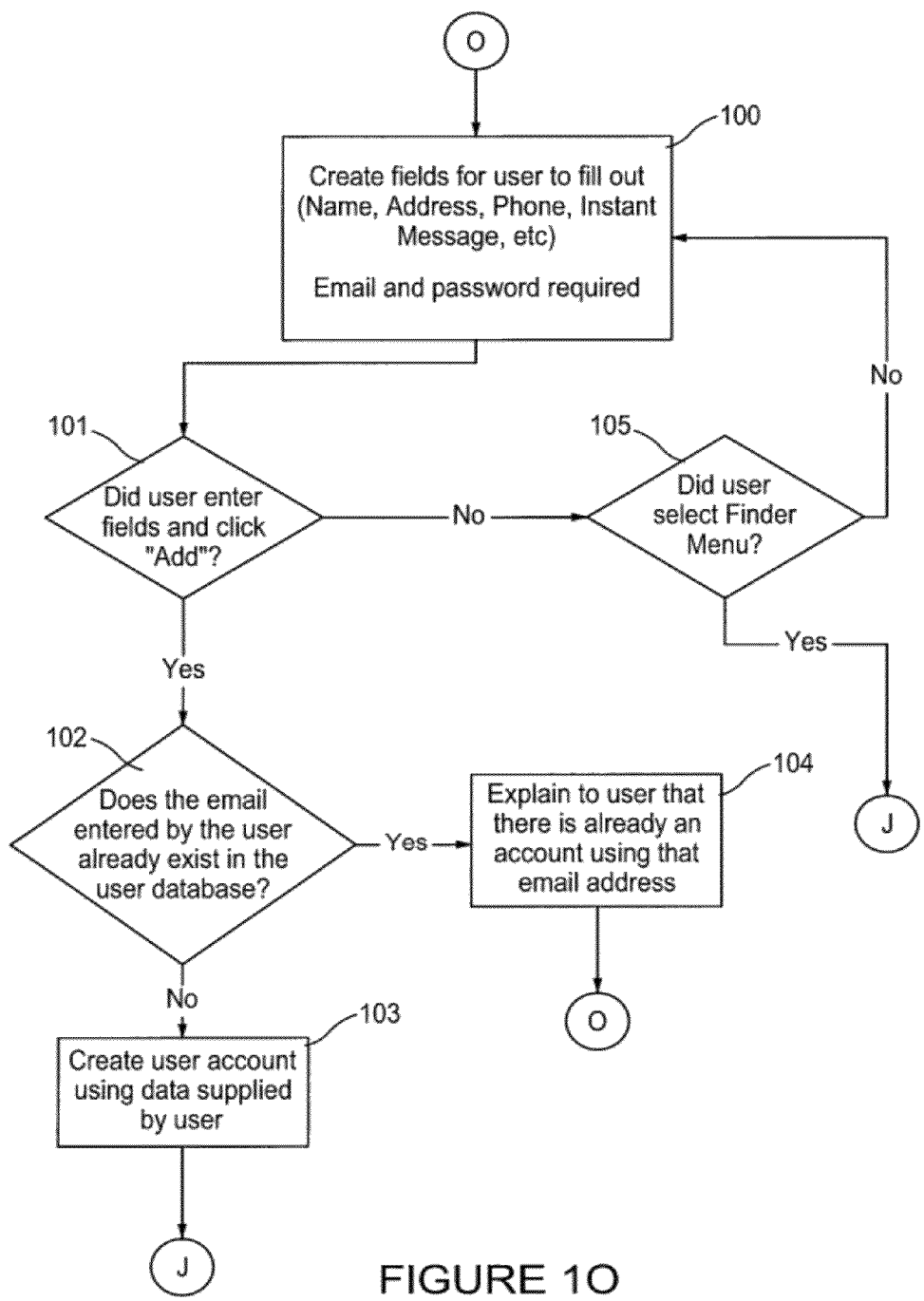
Figure 1P:
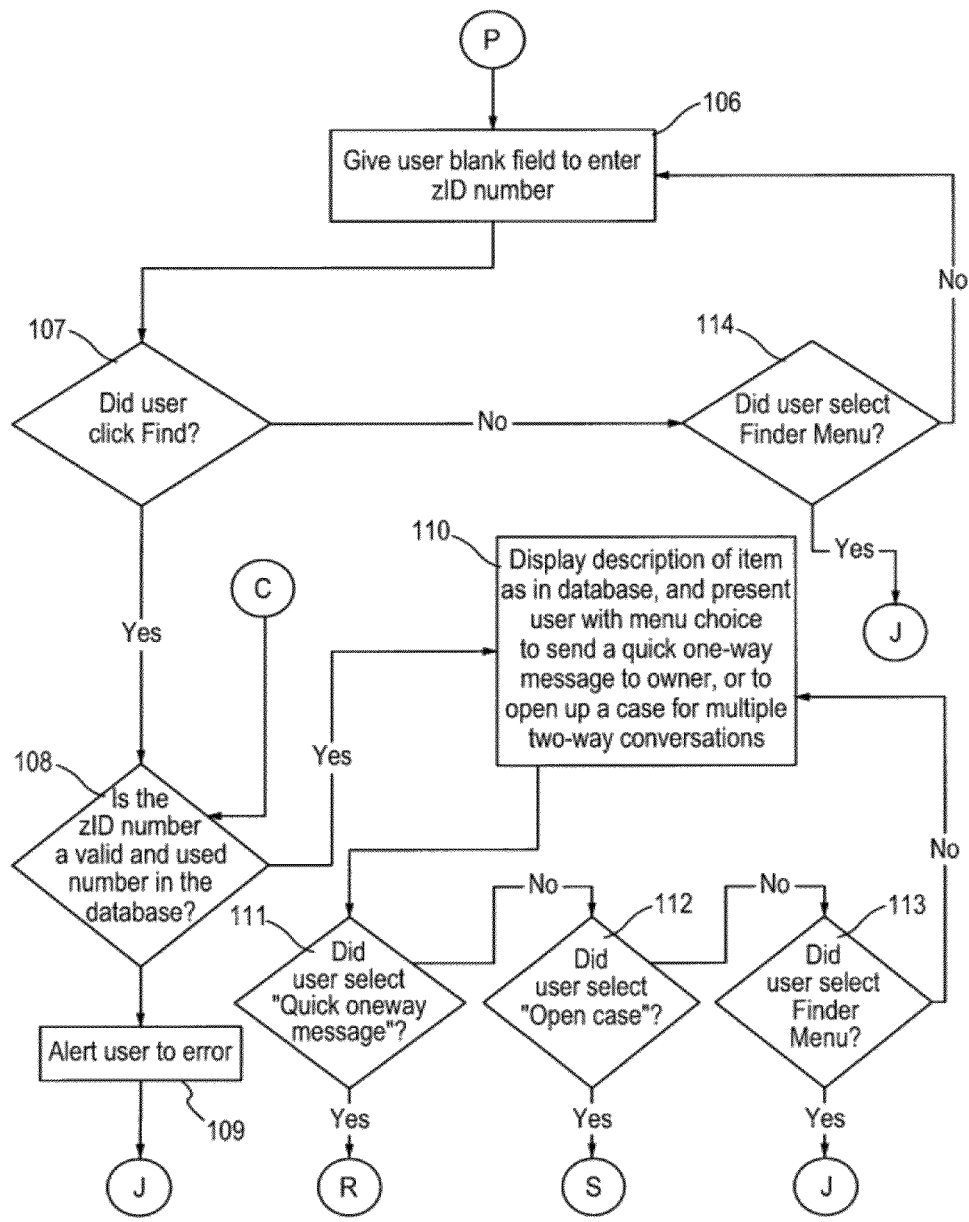

With reference to FIG. 10, in accordance with an exemplary embodiment of the present invention, when a finder wishes to see open cases, where an open case is defined as an instance of an open line of communication between a finder and an owner with regard to an owner's tag, the finder selects "view open cases" 1010, ref. 69. Before displaying open cases, however, subroutine L, as shown in FIG. 1L, is called. This subroutine checks that the finder logged on flag is set to true, ref. 42, and returns control to the application at the point of call to this subroutine, ref. 43. If it is not, a suitable message is displayed to the user, ref. 44, and the main finder menu is displayed, ref. 66. If subroutine L verified the finder logged on flag, then the database is queried for open cases, where a finder's userid is listed as the finder, ref. 77 (FIG. 1N). The retrieved data is used to create a list, ref. 78, which is displayed to the user, ref. 79. The list may contain one line for each open case associated with the userid. A line may include two links which, respectively, enable the user to close the case, or communicate with the owner of that case. There may be numerous options throughout this menu, and its submenus, including options, refs. 86 and 87, to return to the main finder menu, ref. 66, without entering any information. The user can close the case, ref. 80, which marks it as closed in the database, ref. 81, and then refreshes the list, starting at ref. 77. Should the user select to contact the owner of a particular case, ref. 82, a display is created with a data entry field in which the user may enter an email message for the associated owner, ref. 83. In a preferred embodiment, the display includes an anonymous email address, created in accordance with the invention, which corresponds to the owner's actual email address. The display also includes a reminder to the finder that they may optionally use the anonymous email address to contact the owner using the finder's own email software. Once the user selects "send message," ref. 84, the message is sent to the owner's real email address, ref. 85. That email address is never displayed to the finder. The display is then refreshed with the open case list by beginning again at ref. 77.

Figure 1Q:
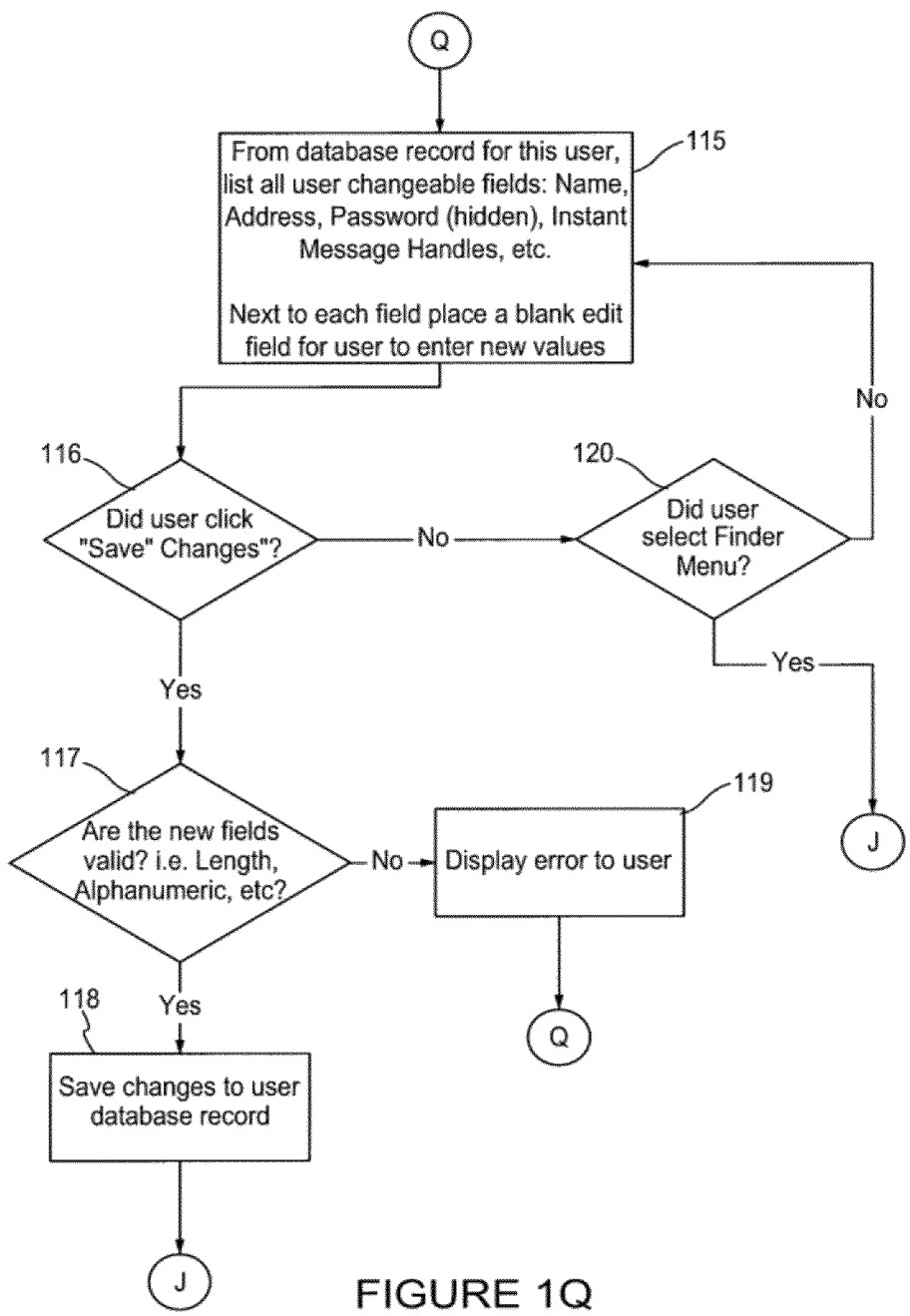
Figure 1R:
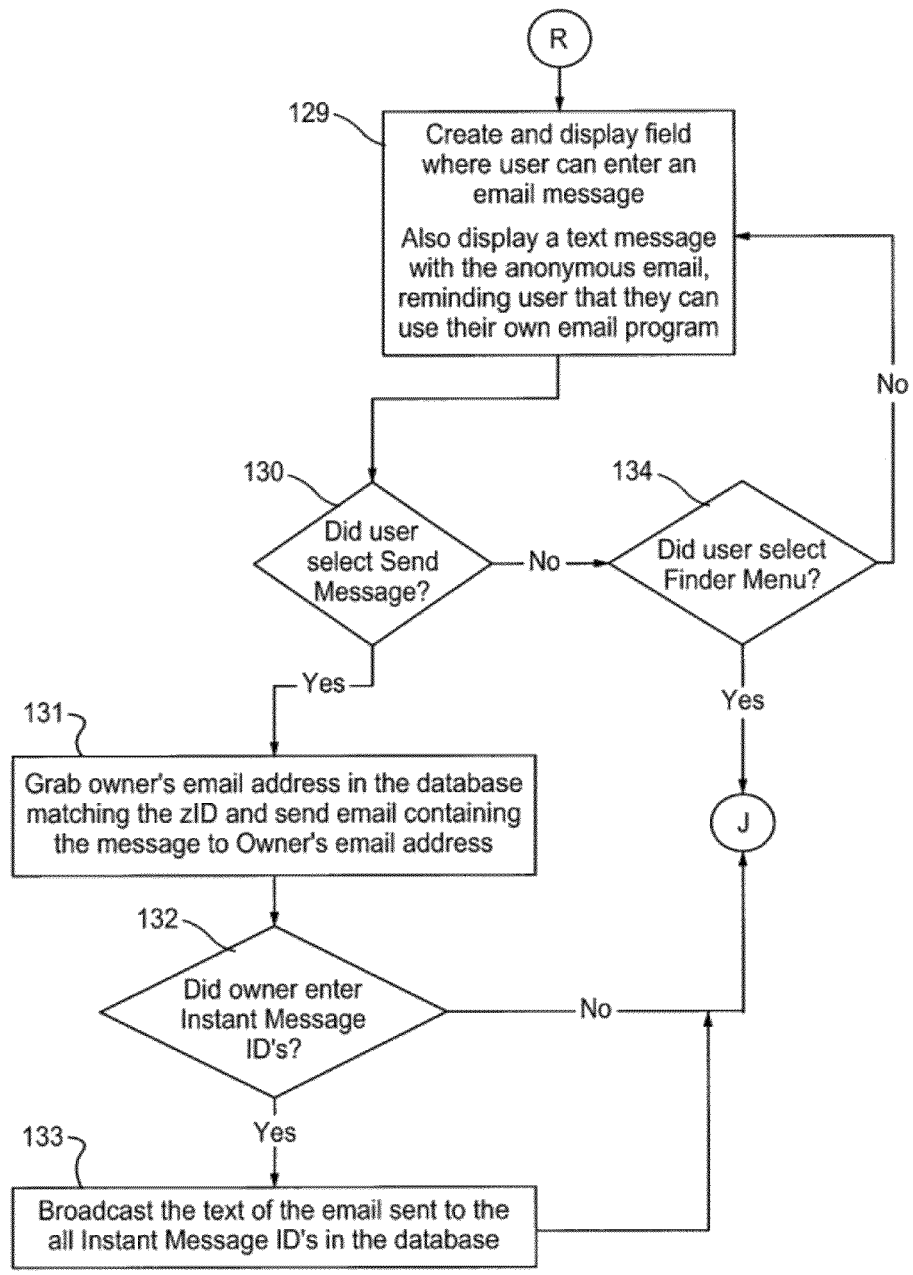
Figure 1S:
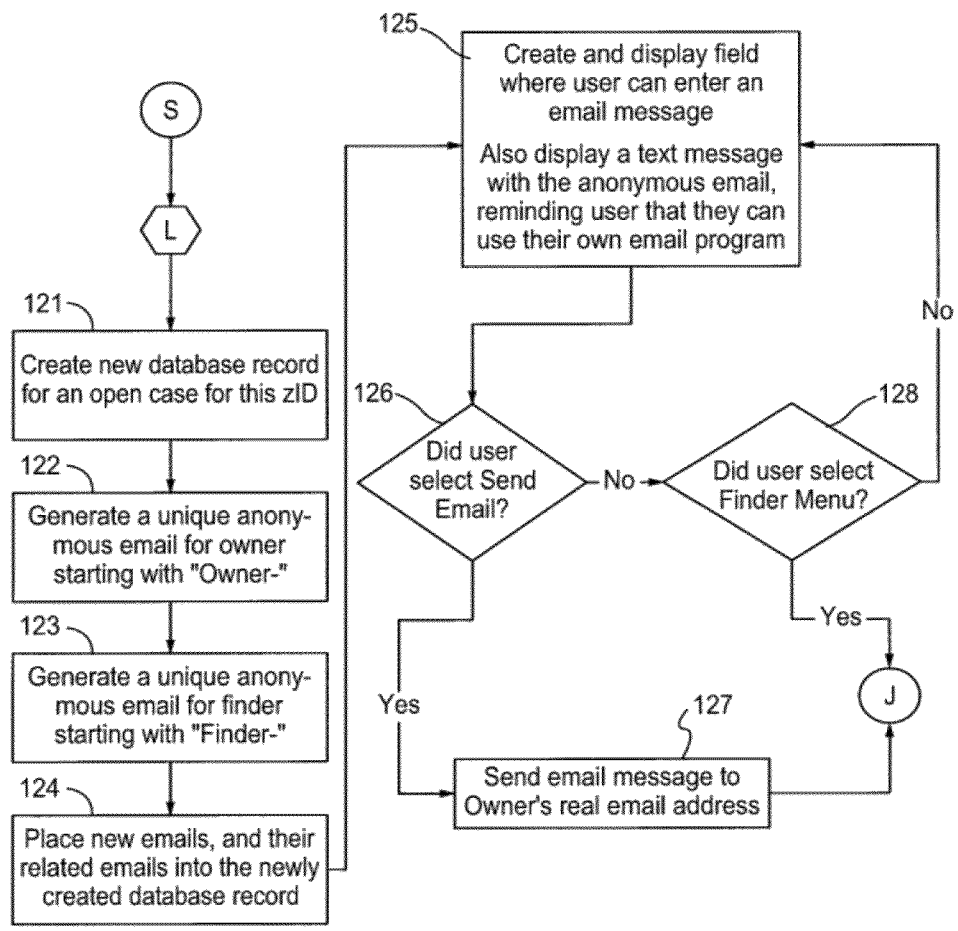

Existing users can chose to edit their account settings 1020, ref. 72. Before displaying the edit account settings screen, subroutine L (FIG. 1L) is called to validate that the finder logged on flag is set to true in a manner similar to that already described with regard to subroutine L. If the logged on flag is properly validated by subroutine L, the database is queried using the previously stored userid for information associated with this user's account settings such as name, addresses, password, email address, and so on. This information is displayed to the user in editable fields, allowing the user to make changes, ref. 115 (FIG. 1Q). Preferably, there is an option that the user may select, ref. 120, to return to the main finder menu, ref 66, without entering or saving any information. Once the user selects save changes, ref. 116, the system confirms that the data are valid, ref. 117, and if so, saves the changes to the database, ref 118, and displays the main finder window, ref. 66. If invalid data were found, appropriate error messages are displayed to the user, ref. 119, and the display is refreshed from ref. 115.

Figure 11:
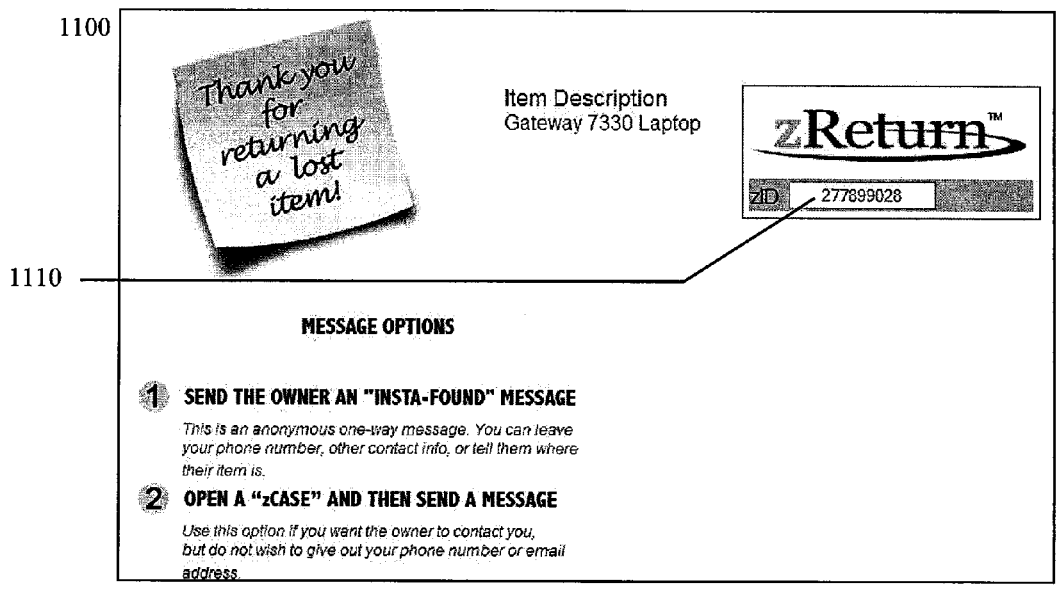
FIG. 11 depicts a send message menu that could be employed in accordance with embodiments of the invention.

In one embodiment a user may choose to search for an ID number, ref. 71. With reference to FIG. 11, upon such a selection, a display 1100 containing a blank field 1110 will prompt the user to enter a search ID number, ref. 106. Preferably, there are options on this menu (not shown in FIG. 11), ref. 114, and its submenus, ref. 113, allowing a user to select to return to the main finder menu, ref. 66, without entering any information. Should the user enter an ID and click find, ref. 107, the database is queried to see if the ID is valid and in use, ref. 108. In one embodiment of the invention, entry to this part of the program, ref. 108, may also occur from the main menu, where an ID field may exist for fast access to the search function. Should the ID not be a valid number for any reason, then the user is alerted, ref. 109, and the finder menu, ref. 66, is displayed. If the ID is valid, the description associated with it is shown, ref. 110, to the user. In a preferred embodiment, two new choices may be displayed, allowing the finder to send a quick one-way anonymous message to the owner or to open up a new case and communicate using anonymous emails addresses.

Figure 12:
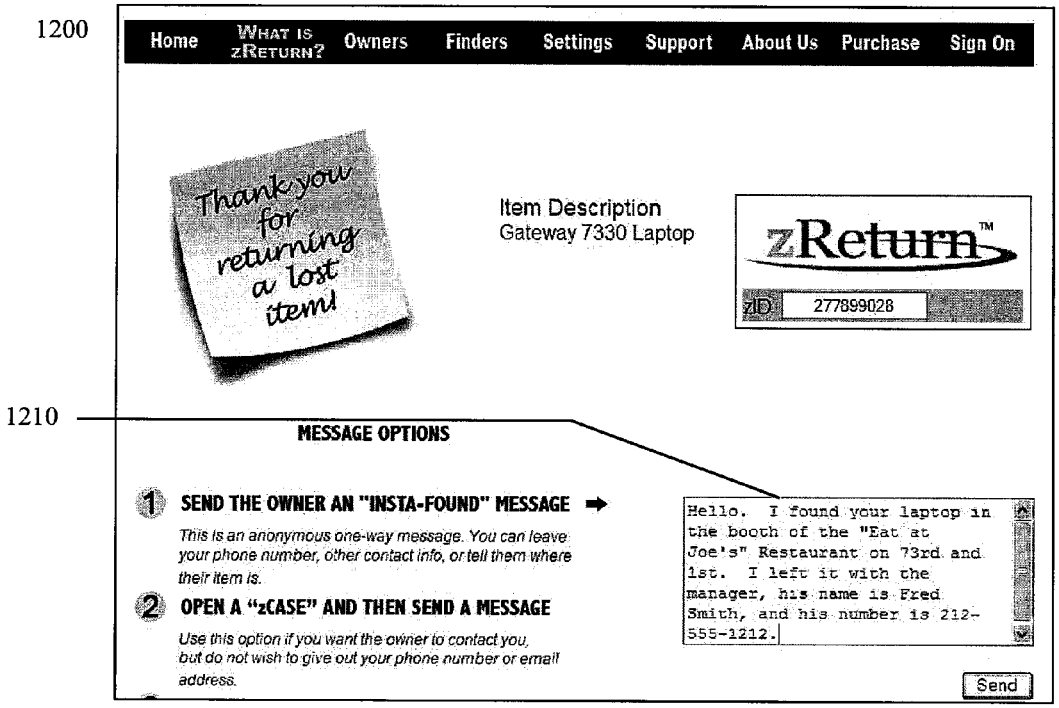
FIG. 12 depicts a short one way message entry screen that could be employed in accordance with embodiments of the invention.

With reference to FIG. 12, if the finder chooses to send a quick one-way message, ref. 111, the user is then prompted to enter an email message into a provided field 1210, ref. 129. Optional text on the display may advise the finder that the quick one-way message is indeed one-way and that the owner will not be able to reply to the finder/sender. Preferably, there is an option, ref. 134, to return to the main finder menu, ref. 66, without entering any information. Once the user selects "send message," ref. 130, the message is directed to the real email address of the owner associated with the entered ID, ref. 131. The owner's real email address is used but never displayed to the finder. If the owner has any other contact information entered, ref. 132, for example, Instant Message handles, then the message is also sent out via those systems, ref. 133. The program then returns to the finder menu, ref. 66.

In one embodiment, a finder may choose to open a new case, ref. 112, for a tag ID associated with a found object. Prior to displaying a new case screen, subroutine L (FIG. 1L) is executed to validate the user logged on flag in a manner previously described for subroutine L. A new database record is created for this case, ref. 121, and two anonymous email addresses are generated. In an exemplary embodiment, one email address begins with "Owner-," ref. 122, and the other with "Finder-," ref. 123. The generated email addresses may include a domain associated with the virtual locale. As an example, if the case involves ID 277899028 and the virtual locale is associated with www.zReturn.com, then the generated addresses could be Owner-277899028@zReturn.com and Finder-277899028@zReturn.com. The real email addresses for both the finder and the owner may be stored in the case record, ref. 124. The finder is then provided a data entry field and prompted to type a message to the owner, ref. 125. Optionally, the owner's anonymous email address may be displayed to the finder with a reminder that the finder may email the owner using the finder's own email program. Once the user selects "send email," ref. 126, the message in the data entry field is directed to the owner's real email address, ref. 127, and; the real email address is never displayed to the user. The program can then return to the finder menu, ref. 66. Preferably, there is an option, ref. 128, on the new case screen allowing a user to return to the main finder menu, ref. 66, without entering any information.

Figure 1U:
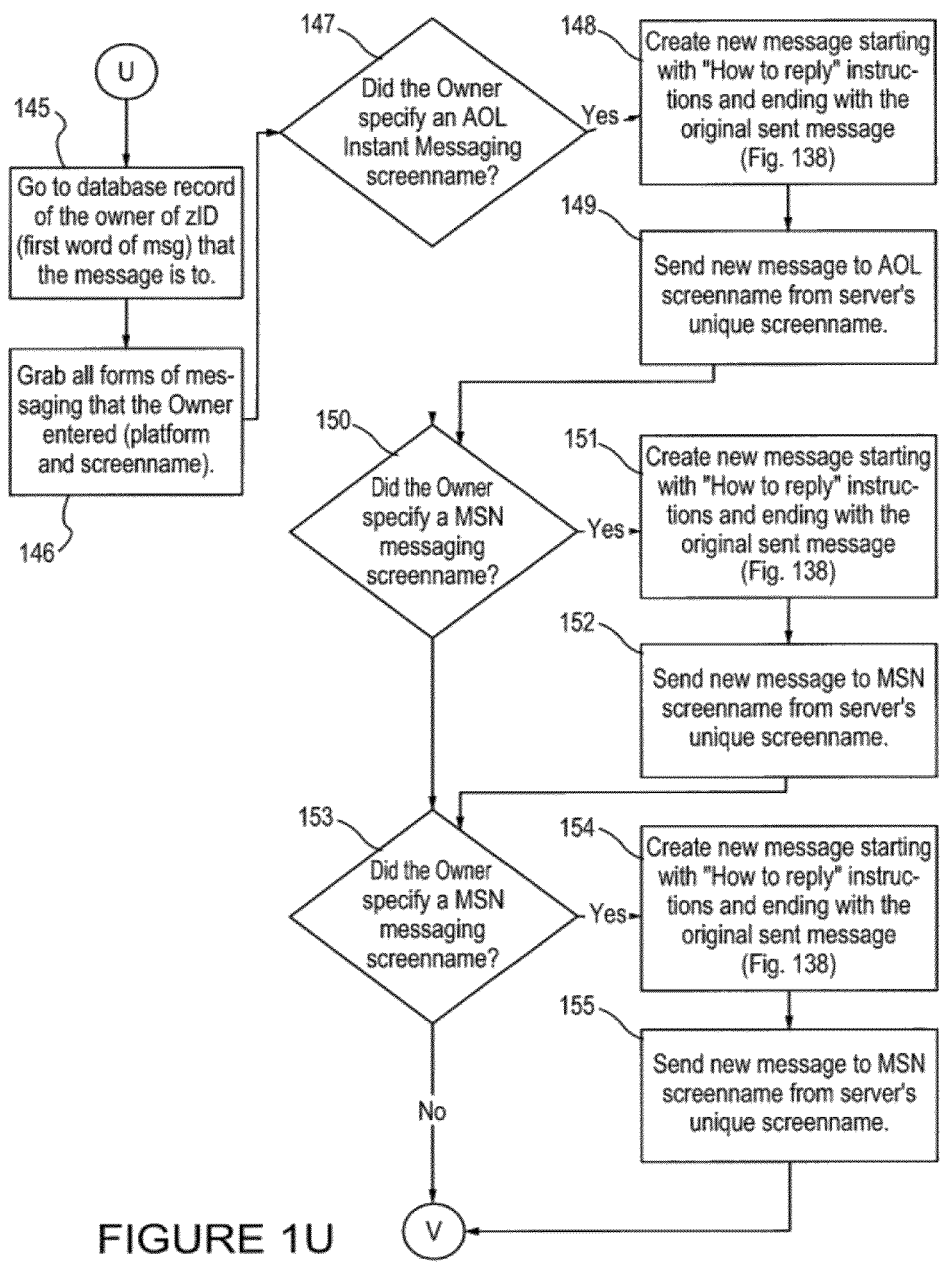
Figure 1V:
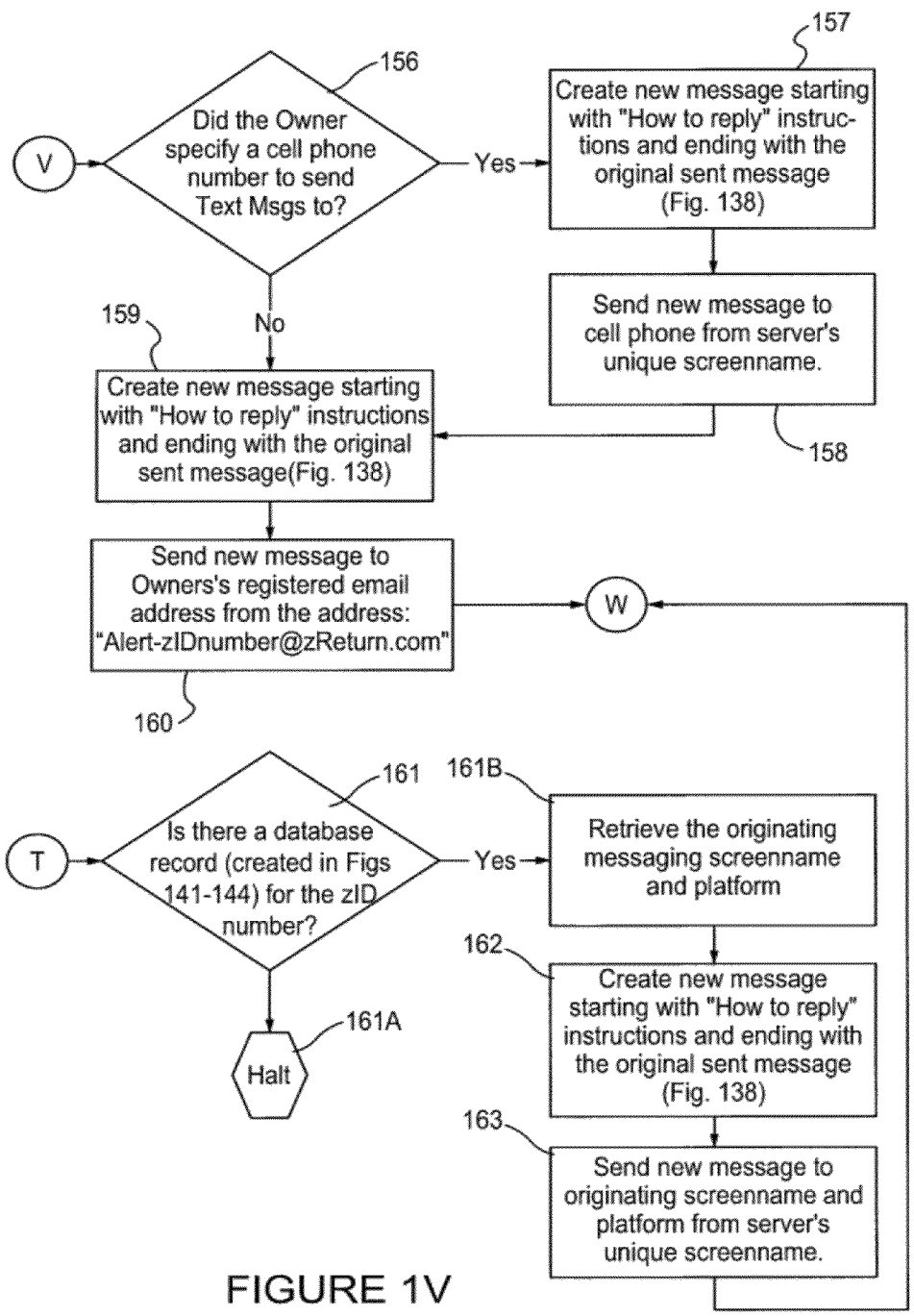
Figure 1X:
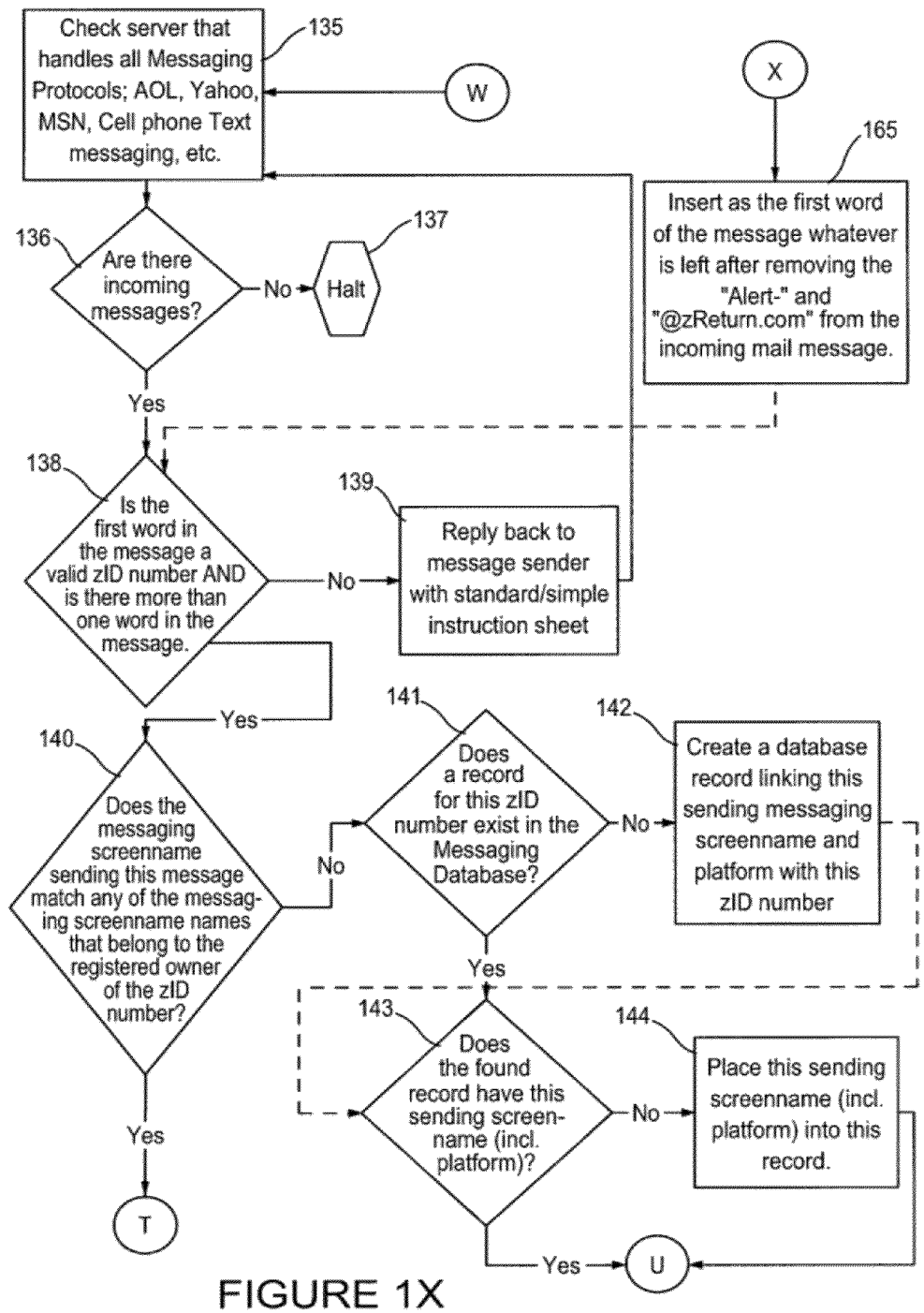
Figure 1Y:
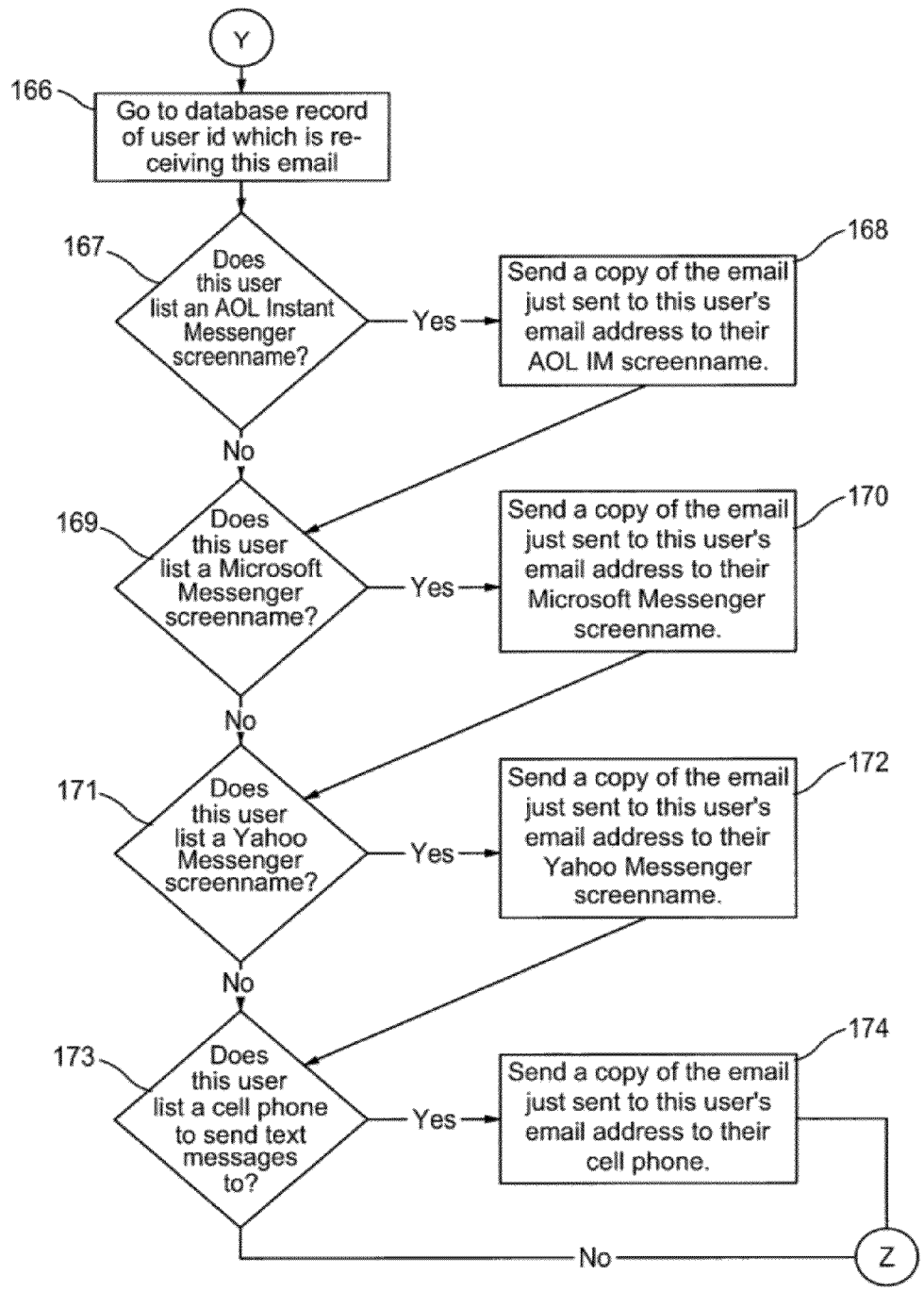
Figure 1Z:
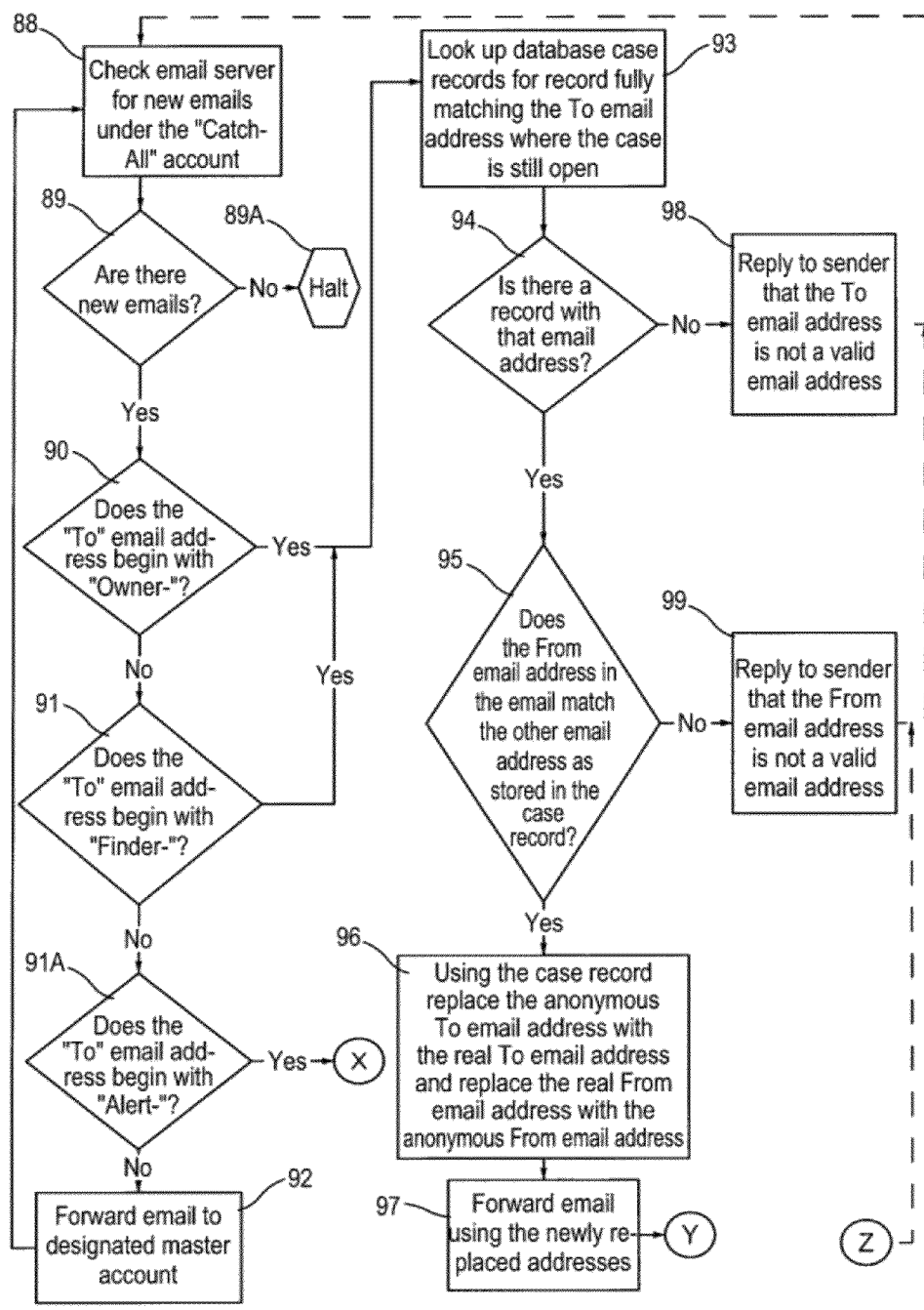

With reference to FIG. 1Z, in a preferred embodiment, a server periodically executes a program to check for incoming email, ref. 88, being delivered to a domain associated with the virtual locale. If there are no emails, the program halts, ref. 89*a*. If an email has arrived, its "To" email address is checked for "Owner-," ref. 90, "Finder-," ref. 91, and "Alert-," ref 91*a*, to determine whether the email is addressed with an anonymized email address. If not, then the email is forwarded to any other account setup for internal use on the server, ref. 92, and the program continues checking for new emails, ref. 88. If the "To" email address begins with "Alert-", then the email is passed off to the server application that handles the Multi-protocol Messaging Translator, ref. 165 (FIG. 1X). Otherwise, a case number associated with the "To" email address is determined and the database is queried for a record of an associated open case, ref 93. If no such record exists, ref. 94, then an auto-generated reply is sent to the sending email address, ref. 98, explaining that no such record exists, and the program starts checking for new emails, ref. 88, again. If a record does exist, the "From" email address is checked versus the email address contained in the record, ref. 95. If the "From" email address is not the same as the record, then a reply is sent to the sender explaining that anonymous emails must be sent from the same email address registered in the case record, ref. 99, and the program starts checking for new emails, ref. 88, again. With reference to examples in FIGS. 13A and 13B, once email addresses have been confirmed, then the "To" anonymous email address 1320 is swapped with a real email address 1340 as per the record and the real "From" email address 1310 is replaced with an anonymous address 1330 from the record, ref. 96. Then, the email is forwarded to the new "To" email address, ref. 97. The receiving user's id record is checked for associated alert contact information such as AOL Instant Messenger, Yahoo Messenger, and/or Microsoft Messenger Handles and/or a cell phone text messaging address. For any of those that the user provided, the email is also forwarded to those systems, refs. 166, 167, 168, 169, 170, 171, 172, 173, and 174 (FIG. 1Y). Then the program starts checking for new emails, ref. 88, again.

With reference to FIG. 1X, in one embodiment, a program run by a server checks periodically for incoming messages from multiple messaging protocols such as AOL, Yahoo, and MSN Text Messaging, ref. 135. If there are no incoming messages, ref. 136, the program halts, ref. 137. If there is a message, the first word of the message is isolated, ref. 138, and checked against the database to see if it is a valid ID. If it is not a valid ID, or there is only one word in the message, then a simple instruction message, such as "How to properly use the system" is sent back as a reply to the sender, ref. 139, and the program goes to check for other new messages.

If the ID is valid, the messaging screenname that sent this message is checked, ref 140, against all forms of messaging names and protocols associated with the owner who registered the ID number contained in the message. If it is determined that this message came from the owner of the ID to which the message refers, then control is passed over to ref. 161. If none of the owner associated names and protocols match the sender of the message, then a messaging database is queried to match up the ID and the message's screenname and protocol, ref 141. If no record is found, then a record is created, linking the ID, the screenname, and the protocol, refs. 142, 143, and 144.

Figure 14:
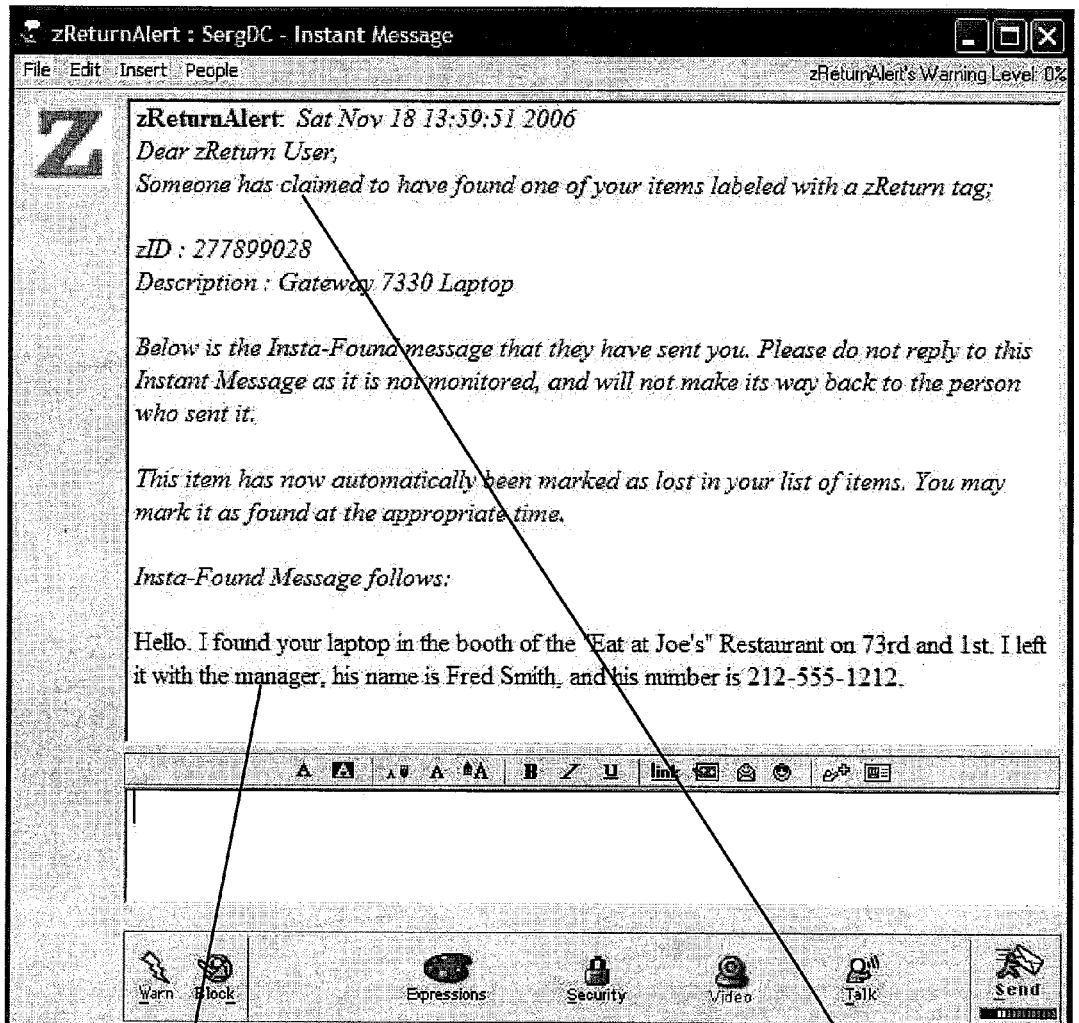
FIG. 14 depicts an instant message that could be sent in accordance with an embodiment of the invention.

Continuing with the exemplary embodiment for handling inbound Instant Messages, the inbound message will be directed to the owner's designated IM addresses. With reference to FIG. 14, for each existing form of alert that the owner registered, e.g. AOL, MSN, Yahoo, cell phone text messaging, and so on, the software will make a new message that may optionally include an introduction concerning the nature of the message 1410 and how to properly reply to it. The message will include the message sent by the sender 1420. The message will be sent to each of these messaging options registered by the owner, refs. 145, 146, 147, 148, 149, 150, 151, 152, 153, 154, 155, 156, 157, and 158 (FIG. 1U). A new message, as described above, may optionally be sent to the owner's email address. The "From" email address may be of a form similar to "Alert-XXX@zReturn.com," where XXX is the ID number. The software application then looks for more incoming messages, ref. 135 (FIG. 1X).

Finally, if it is determined that the inbound message originated from an owner of an ID to which the inbound message refers, then the application looks in the alert database for the record created by the sender of the original message, refs. 141, 142, 143, and 144. If no record can be found the application halts, refs. 161, 161a. Otherwise, the screenname and protocol are pulled from the found record, and a new message is created which may optionally include an introduction on what this message is, and how to properly reply to it. The message includes the message sent by the sender. The new message is then sent to the screenname and platform from the record in the alert database, refs. 161b, 162, 163, and the program continues to look for more messages, ref. 135.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art given the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Furthermore, a person skilled in the art will recognize that some aspects of the present invention, described with reference to a sequence of condition checks, may be easily implemented with an event driven code design.

Aspects of the described system and method may be implemented in a programming language such as the Perl programming language in conjunction with the Apache open source web server software and the MySQL open source relational database running under the Linux operating system. Additionally, those of skill in the art are aware of open source modules available to aid in implementing aspects of the present invention. For example, the Perl module Net-Oscar is available from cpan.org and is operable to interface with instant messaging systems such as AOL instant messenger and ICQ. However, other programming languages, operating systems, and database systems are adaptable to the present invention and may also be used.

We claim:

1. A method of facilitating communication between a finder of an article and an owner of the article comprising:
   receiving, by a server computer, contact information of the owner;
   storing, by the server computer, in a database the contact information of the owner in association with a unique ID;
   receiving, by the server computer, the unique ID and a finder communication from the finder;
   retrieving, by the server computer, from the database the contact information of the owner associated with the unique ID;
   determining, by the server computer, whether a case associated with the unique ID is open or closed;
   forwarding, by the server computer, the finder communication to the owner using the contact information of the owner associated with the unique ID if the case associated with the unique ID is open.

2. The method of claim 1, wherein a tag includes the unique ID and a virtual locale enabling navigation to the server computer.

3. The method of claim 1, further comprising:
   receiving, by the server computer, contact information of the finder;
   storing, by the server computer, in the database the contact information of the finder in association with the unique ID;
   receiving, by the server computer, an owner communication from the owner; and
   forwarding, by the server computer, the owner communication to the finder using the contact information of the finder.

4. The method of claim 3, further comprising:
   generating, by the server computer, a unique anonymous email address for the finder; and
   providing, by the server computer, the unique anonymous email address for the finder to the finder.

5. The method of claim 4, wherein the owner communication is addressed to the unique anonymous email address for the finder and includes contact information of the owner, and the method further comprises:

generating, by the server computer, a unique anonymous email address for the owner; and replacing, by the server computer, the contact information of the owner with the unique anonymous email address for the owner before the owner communication is forwarded to the finder.

6. The method of claim 1, wherein the contact information of the owner is one or more of an email address, an instant messaging handle, and a cell phone number.

7. The method of claim 1, further comprising:

generating, by the server computer, a unique anonymous email address for the finder or the owner, the email address including a domain associated with a virtual location enabling navigation to the server computer.

8. The method of claim 1, further comprising:

generating, by the server computer, a unique anonymous email address for the owner; and providing, by the server computer, the unique anonymous email address for the owner to the finder.

9. The method of claim 8, wherein the finder communication is addressed to the unique anonymous email address for the owner and includes contact information of the finder, and the method further comprises:

generating, by the server computer, a unique anonymous email address for the finder; and replacing, by the server computer, the contact information of the finder with the unique anonymous email address for the finder before the finder communication is forwarded to the owner.

10. The method of claim 1, further comprising:

receiving, by the server computer, a plurality of contact information of the owner, wherein each contact information may be one of an email address, an instant messaging handle, and a cell phone number; and storing, by the server computer, in the database each of the plurality of contact information of the owner in association with a unique ID;

wherein the forwarding the finder communication to the owner using the contact information of the owner associated with the unique ID further comprises forwarding the finder communication to each of the plurality of contact information of the owner.

11. The method of claim 1, wherein the received contact information of the owner is received from the owner, and the method further comprises receiving, by the server computer, the unique ID from the owner.

12. A computer implemented system for facilitating communication between a finder of an article and an owner of the article, the system comprising:

a network accessible database; and a server computer configured to:

receive contact information of the owner;

store in the database the contact information of the owner in association with a unique ID;

receive the unique ID and a finder communication from the finder;

retrieve from the database the contact information of the owner associated with the unique ID;

determine whether a case associated with the unique ID is open or closed;

forward the finder communication to the owner using the contact information of the owner associated with the unique ID if the case associated with the unique ID is open.

13. The system of claim 12, further comprising a tag includes the unique ID and a virtual locale enabling navigation to the server computer.

14. The system of claim 12, wherein the server computer is further configured to:

receive contact information of the finder;

store in the database the contact information of the finder in association with the unique ID;

receive an owner communication from the owner; and forward the owner communication to the finder using the contact information of the finder.

15. The system of claim 14, wherein the server computer is further configured to:

generate a unique anonymous email address for the finder; and provide the unique anonymous email address for the finder to the finder.

16. The system of claim 15, wherein the owner communication is addressed to the unique anonymous email address for the finder and includes contact information of the owner, and the server computer is further configured to:

generate a unique anonymous email address for the owner; and replace the contact information of the owner with the unique anonymous email address for the owner before the owner communication is forwarded to the finder.

17. The system of claim 12, wherein the contact information of the owner is one or more of an email address, an instant messaging handle, and a cell phone number.

18. The system of claim 12, wherein the server computer is further configured to:

generate a unique anonymous email address for the owner; and provide the unique anonymous email address for the owner to the finder.

19. The system of claim 18, wherein the finder communication is addressed to the unique anonymous email address for the owner and includes contact information of the finder, and the server computer is further configured to:

generate a unique anonymous email address for the finder; and replace the contact information of the finder with the unique anonymous email address for the finder before the finder communication is forwarded to the owner.

20. The system of claim 12, wherein the server computer is further configured to:

receive a plurality of contact information of the owner, wherein each contact information may be one of an email address, an instant messaging handle, and a cell phone number; and store in the database each of the plurality of contact information of the owner in association with a unique ID; and wherein the forwarding the finder communication to the owner using the contact information of the owner associated with the unique ID further comprises forwarding the finder communication to each of the plurality of contact information of the owner.

21. A method of facilitating communication between a finder of an article and an owner of the article comprising:

(a) receiving, by a server computer, contact information of the owner;

(b) storing, by the server computer, in a database the contact information of the owner in association with a unique ID;

(c) receiving, by the server computer, the unique ID from the finder;

(d) retrieving, by the server computer, from the database the contact information of the owner associated with the unique ID;

(e) determining, by the server computer, whether a case associated with the unique ID is open or closed; and
(f) if the case associated with the unique ID is open:
  (i) generating, by the server computer, a unique anonymous email address for the owner;
  (ii) providing, by the server computer, the unique anonymous email address for the owner to the finder;
  (iii) receiving, by the server computer, a finder communication addressed to the unique anonymous email address for the owner;
  (iv) forwarding, by the server computer, the finder communication to the owner using the contact information of the owner associated with the unique ID.

\* \* \* \* \*